United States Patent
Huber et al.

(10) Patent No.: US 9,467,533 B2
(45) Date of Patent: Oct. 11, 2016

(54) SYSTEM AND METHOD FOR DEVELOPING REAL-TIME WEB-SERVICE OBJECTS

(71) Applicant: PTC Inc., Needham, MA (US)

(72) Inventors: Philip J. Huber, Newport Beach, CA (US); Lawrence Fan, Irvine, CA (US); Samuel T. Malapas, Irvine, CA (US); Brandon Hahr, Irvine, CA (US); Rick Bullotta, Phoenixville, PA (US)

(73) Assignee: PTC Inc., Needham, MA (US)

( * ) Notice: Subject to any disclaimer, the term of this patent is extended or adjusted under 35 U.S.C. 154(b) by 49 days.

(21) Appl. No.: 14/222,276

(22) Filed: Mar. 21, 2014

(65) Prior Publication Data

US 2015/0268949 A1  Sep. 24, 2015

(51) Int. Cl.
| | |
|---|---|
| *G06F 9/44* | (2006.01) |
| *G06F 9/445* | (2006.01) |
| *H04L 29/06* | (2006.01) |
| *G06F 17/30* | (2006.01) |
| *H04L 29/08* | (2006.01) |

(52) U.S. Cl.
CPC .............. *H04L 67/42* (2013.01); *G06F 8/36* (2013.01); *G06F 9/44521* (2013.01); *G06F 17/3089* (2013.01); *H04L 67/2842* (2013.01)

(58) Field of Classification Search
CPC .............. G06F 8/20; G06F 8/60–8/65; G06F 17/3089; G06F 8/36; G06F 9/44521; H04L 67/42; H04L 67/2842
See application file for complete search history.

(56) References Cited

U.S. PATENT DOCUMENTS

| 3,656,112 A | 4/1972 | Paull |
|---|---|---|
| 3,916,412 A | 10/1975 | Amoroso, Jr. |

(Continued)

FOREIGN PATENT DOCUMENTS

| EP | 0497010 A2 | 8/1992 |
|---|---|---|
| EP | 1187015 A2 | 3/2002 |

(Continued)

OTHER PUBLICATIONS

PJ Murray, Corba and Web Services, 2002, pp. 1-20.*

(Continued)

*Primary Examiner* — Thuy Dao
*Assistant Examiner* — Mongbao Nguyen
(74) *Attorney, Agent, or Firm* — Meunier Carlin & Curfman LLC

(57) ABSTRACT

A system and method for developing real-time web-service objects. The method includes providing a client-side application running on a connected device. The client-side application executes Webpage definition files having a composite Web-service objects, including a first and second composite Web-service objects where each of the object has been associatively linked to a data service from a data source. The method includes receiving, during runtime of the client-side application, a first updated data content from the data source. The method includes caching the first updated data content in memory and, upon receiving a second updated data content, retrieving the first updated data content from memory and updating the composite Web-service objects of the Webpage definition files using the first and second update data contents.

22 Claims, 15 Drawing Sheets

(56) References Cited

U.S. PATENT DOCUMENTS

| | | |
|---|---|---|
| 3,983,484 A | 9/1976 | Hodama |
| 4,063,173 A | 12/1977 | Nelson et al. |
| 4,103,250 A | 7/1978 | Jackson |
| 4,134,068 A | 1/1979 | Richardson |
| 4,216,546 A | 8/1980 | Litt |
| 4,554,668 A | 11/1985 | Deman et al. |
| 4,601,059 A | 7/1986 | Gammenthaler |
| 4,680,582 A | 7/1987 | Mejia |
| 4,704,585 A | 11/1987 | Lind |
| 4,887,204 A | 12/1989 | Johnson et al. |
| 4,979,170 A | 12/1990 | Gilhousen et al. |
| 5,113,416 A | 5/1992 | Lindell |
| 5,134,615 A | 7/1992 | Freeburg et al. |
| 5,159,704 A | 10/1992 | Pirolli et al. |
| 5,230,072 A | 7/1993 | Smith et al. |
| 5,276,703 A | 1/1994 | Budin et al. |
| 5,361,401 A | 11/1994 | Pirillo |
| 5,422,889 A | 6/1995 | Sevenhans et al. |
| 5,454,010 A | 9/1995 | Leveque |
| 5,479,441 A | 12/1995 | Tymes et al. |
| 5,493,671 A | 2/1996 | Pitt et al. |
| 5,515,365 A | 5/1996 | Sumner et al. |
| 5,734,966 A | 3/1998 | Farrer et al. |
| 5,737,609 A | 4/1998 | Reed et al. |
| 5,805,442 A | 9/1998 | Crater et al. |
| 5,892,962 A | 4/1999 | Cloutier |
| 5,909,640 A | 6/1999 | Farrer et al. |
| 5,925,100 A | 7/1999 | Drewry et al. |
| 6,169,992 B1 | 1/2001 | Beall et al. |
| 6,182,252 B1 | 1/2001 | Wong et al. |
| 6,198,480 B1 | 3/2001 | Cotugno et al. |
| 6,345,288 B1 * | 2/2002 | Reed ............... H04L 63/045 707/999.001 |
| 6,377,162 B1 | 4/2002 | Delestienne et al. |
| 6,430,602 B1 | 8/2002 | Kay et al. |
| 6,473,788 B1 | 10/2002 | Kim et al. |
| 6,510,350 B1 | 1/2003 | Steen, III et al. |
| 6,553,405 B1 | 4/2003 | Desrochers |
| 6,570,867 B1 | 5/2003 | Robinson et al. |
| 6,618,709 B1 | 9/2003 | Sneeringer |
| 6,675,193 B1 | 1/2004 | Slavin et al. |
| 6,757,714 B1 | 6/2004 | Hansen |
| 6,766,361 B1 | 7/2004 | Venigalla |
| 6,797,921 B1 | 9/2004 | Niedereder et al. |
| 6,810,522 B2 | 10/2004 | Cook et al. |
| 6,813,587 B2 | 11/2004 | McIntyre et al. |
| 6,850,255 B2 | 2/2005 | Muschetto |
| 6,859,757 B2 | 2/2005 | Muehl et al. |
| 6,915,330 B2 | 7/2005 | Hardy et al. |
| 6,980,558 B2 | 12/2005 | Aramoto |
| 6,993,555 B2 | 1/2006 | Kay et al. |
| 7,031,520 B2 | 4/2006 | Tunney |
| 7,046,134 B2 | 5/2006 | Hansen |
| 7,047,159 B2 | 5/2006 | Muehl et al. |
| 7,054,922 B2 | 5/2006 | Kinney et al. |
| 7,082,383 B2 | 7/2006 | Baust et al. |
| 7,082,460 B2 | 7/2006 | Hansen et al. |
| 7,117,239 B1 | 10/2006 | Hansen |
| 7,130,812 B1 | 10/2006 | Iyer et al. |
| 7,149,792 B1 | 12/2006 | Hansen et al. |
| 7,178,149 B2 | 2/2007 | Hansen |
| 7,185,014 B1 | 2/2007 | Hansen |
| 7,250,862 B2 | 7/2007 | Bornhoevd et al. |
| 7,254,601 B2 | 8/2007 | Baller et al. |
| 7,269,732 B2 | 9/2007 | Kilian-Kehr |
| 7,341,197 B2 | 3/2008 | Muehl et al. |
| 7,380,236 B2 | 5/2008 | Hawley |
| 7,496,911 B2 | 2/2009 | Rowley et al. |
| 7,529,570 B2 | 5/2009 | Shirota |
| 7,529,750 B2 | 5/2009 | Bair |
| 7,536,673 B2 | 5/2009 | Brendle et al. |
| 7,555,355 B2 | 6/2009 | Meyer |
| 7,566,005 B2 | 7/2009 | Heusermann et al. |
| 7,570,755 B2 | 8/2009 | Williams et al. |
| 7,587,251 B2 | 9/2009 | Hopsecger |
| 7,591,006 B2 | 9/2009 | Werner |
| 7,593,917 B2 | 9/2009 | Werner |
| 7,613,290 B2 | 11/2009 | Williams et al. |
| 7,616,642 B2 | 11/2009 | Anke et al. |
| 7,617,198 B2 | 11/2009 | Durvasula |
| 7,624,092 B2 | 11/2009 | Lieske et al. |
| 7,624,371 B2 | 11/2009 | Kulkarni et al. |
| 7,644,120 B2 | 1/2010 | Todorov et al. |
| 7,644,129 B2 | 1/2010 | Videlov |
| 7,647,407 B2 | 1/2010 | Omshehe et al. |
| 7,650,607 B2 | 1/2010 | Resnick et al. |
| 7,653,902 B2 | 1/2010 | Bozak et al. |
| 7,673,141 B2 | 3/2010 | Kilian-Kehr et al. |
| 7,684,621 B2 | 3/2010 | Tunney |
| 7,703,024 B2 | 4/2010 | Kautzleben et al. |
| 7,707,550 B2 | 4/2010 | Resnick et al. |
| 7,725,815 B2 | 5/2010 | Peters |
| 7,728,838 B2 | 6/2010 | Forney et al. |
| 7,730,498 B2 | 6/2010 | Resnick et al. |
| 7,743,015 B2 | 6/2010 | Schmitt |
| 7,743,155 B2 | 6/2010 | Pisharody et al. |
| 7,752,335 B2 | 7/2010 | Boxenhorn |
| 7,757,234 B2 | 7/2010 | Krebs |
| 7,761,354 B2 | 7/2010 | Kling et al. |
| 7,774,369 B2 | 8/2010 | Herzog et al. |
| 7,779,089 B2 | 8/2010 | Hessmer et al. |
| 7,779,383 B2 | 8/2010 | Bornhoevd et al. |
| 7,783,984 B2 | 8/2010 | Roediger et al. |
| 7,802,238 B2 | 9/2010 | Clinton |
| 7,814,044 B2 | 10/2010 | Schwerk |
| 7,814,208 B2 | 10/2010 | Stephenson et al. |
| 7,817,039 B2 | 10/2010 | Bornhoevd et al. |
| 7,827,169 B2 | 11/2010 | Enenkiel |
| 7,831,600 B2 | 11/2010 | Kilian |
| 7,840,701 B2 | 11/2010 | Hsu et al. |
| 7,852,861 B2 | 12/2010 | Wu et al. |
| 7,853,241 B1 | 12/2010 | Harrison |
| 7,853,924 B2 | 12/2010 | Curran |
| 7,860,968 B2 | 12/2010 | Bornhoevd et al. |
| 7,865,442 B1 | 1/2011 | Sowell |
| 7,865,731 B2 | 1/2011 | Kilian-Kehr |
| 7,865,939 B2 | 1/2011 | Schuster |
| 7,873,666 B2 | 1/2011 | Sauermann |
| 7,882,148 B2 | 2/2011 | Werner et al. |
| 7,886,278 B2 | 2/2011 | Stulski |
| 7,890,388 B2 | 2/2011 | Mariotti |
| 7,890,568 B2 | 2/2011 | Belenki |
| 7,895,115 B2 | 2/2011 | Bayyapu et al. |
| 7,899,777 B2 | 3/2011 | Baier et al. |
| 7,899,803 B2 | 3/2011 | Cotter et al. |
| 7,908,278 B2 | 3/2011 | Akkiraju et al. |
| 7,917,629 B2 | 3/2011 | Werner |
| 7,921,137 B2 | 4/2011 | Lieske et al. |
| 7,921,686 B2 | 4/2011 | Bagepalli et al. |
| 7,925,979 B2 | 4/2011 | Forney et al. |
| 7,937,370 B2 | 5/2011 | Hansen |
| 7,937,408 B2 | 5/2011 | Stuhec |
| 7,945,691 B2 | 5/2011 | Dharamshi |
| 7,953,219 B2 | 5/2011 | Freedman et al. |
| 7,954,107 B2 | 5/2011 | Mao et al. |
| 7,954,115 B2 | 5/2011 | Gisolfi |
| 7,966,418 B2 | 6/2011 | Shedrinsky |
| 7,975,024 B2 | 7/2011 | Nudler |
| 7,987,176 B2 | 7/2011 | Latzina et al. |
| 7,987,193 B2 | 7/2011 | Ganapam et al. |
| 7,992,200 B2 | 8/2011 | Kuehr-McLaren et al. |
| 8,000,991 B2 | 8/2011 | Montagut |
| 8,005,879 B2 | 8/2011 | Bornhoevd et al. |
| 8,024,218 B2 | 9/2011 | Kumar et al. |
| 8,024,743 B2 | 9/2011 | Werner |
| 8,051,045 B2 | 11/2011 | Vogler |
| 8,055,758 B2 | 11/2011 | Hansen |
| 8,055,787 B2 | 11/2011 | Victor et al. |
| 8,060,886 B2 | 11/2011 | Hansen |
| 8,065,397 B2 | 11/2011 | Taylor et al. |
| 8,069,362 B2 | 11/2011 | Gebhart et al. |
| 8,073,331 B1 | 12/2011 | Mazed |
| 8,074,215 B2 | 12/2011 | Cohen et al. |
| 8,081,584 B2 | 12/2011 | Thibault et al. |

(56) References Cited

U.S. PATENT DOCUMENTS

| | | |
|---|---|---|
| 8,082,322 B1 | 12/2011 | Pascarella et al. |
| 8,090,452 B2 | 1/2012 | Johnson et al. |
| 8,090,552 B2 | 1/2012 | Henry et al. |
| 8,095,632 B2 | 1/2012 | Hessmer et al. |
| 8,108,543 B2 | 1/2012 | Hansen |
| 8,126,903 B2 | 2/2012 | Lehmann et al. |
| 8,127,237 B2 | 2/2012 | Beringer |
| 8,131,694 B2 | 3/2012 | Bender et al. |
| 8,131,838 B2 | 3/2012 | Bornhoevd et al. |
| 8,136,034 B2 | 3/2012 | Stanton et al. |
| 8,145,468 B2 | 3/2012 | Fritzsche et al. |
| 8,145,681 B2 | 3/2012 | Macaleer et al. |
| 8,151,257 B2 | 4/2012 | Zachmann |
| 8,156,117 B2 | 4/2012 | Krylov et al. |
| 8,156,208 B2 | 4/2012 | Bornhoevd et al. |
| 8,156,473 B2 | 4/2012 | Heidasch |
| 8,183,995 B2 | 5/2012 | Wang et al. |
| 8,190,708 B1 | 5/2012 | Short et al. |
| 8,229,944 B2 | 7/2012 | Latzina et al. |
| 8,230,333 B2 | 7/2012 | Decherd et al. |
| 8,249,906 B2 | 8/2012 | Ponce de Leon |
| 8,250,169 B2 | 8/2012 | Beringer et al. |
| 8,254,249 B2 | 8/2012 | Wen et al. |
| 8,261,193 B1 | 9/2012 | Alur et al. |
| 8,271,935 B2 | 9/2012 | Lewis |
| 8,280,009 B2 | 10/2012 | Stepanian |
| 8,284,033 B2 | 10/2012 | Moran |
| 8,285,807 B2 | 10/2012 | Slavin et al. |
| 8,291,039 B2 | 10/2012 | Shedrinsky |
| 8,291,475 B2 | 10/2012 | Jackson et al. |
| 8,296,198 B2 | 10/2012 | Bhatt et al. |
| 8,296,266 B2 | 10/2012 | Lehmann et al. |
| 8,296,413 B2 | 10/2012 | Bornhoevd et al. |
| 8,301,770 B2 | 10/2012 | van Coppenolle et al. |
| 8,306,635 B2 | 11/2012 | Pryor |
| 8,312,383 B2 | 11/2012 | Gilfix |
| 8,321,790 B2 | 11/2012 | Sherrill et al. |
| 8,321,792 B1 | 11/2012 | Alur et al. |
| 8,331,855 B2 | 12/2012 | Williams et al. |
| 8,346,520 B2 | 1/2013 | Lu et al. |
| 8,359,116 B2 | 1/2013 | Manthey |
| 8,364,300 B2 | 1/2013 | Pouyez et al. |
| 8,370,479 B2 | 2/2013 | Hart et al. |
| 8,370,826 B2 | 2/2013 | Johnson et al. |
| 8,375,292 B2 | 2/2013 | Coffman et al. |
| 8,375,362 B1 | 2/2013 | Brette et al. |
| RE44,110 E | 3/2013 | Venigalla |
| 8,392,116 B2 | 3/2013 | Lehmann et al. |
| 8,392,561 B1 | 3/2013 | Dyer et al. |
| 8,396,929 B2 | 3/2013 | Helfman et al. |
| 8,397,056 B1 | 3/2013 | Malks et al. |
| 8,406,119 B2 | 3/2013 | Taylor et al. |
| 8,412,579 B2 | 4/2013 | Gonzalez |
| 8,417,764 B2 | 4/2013 | Fletcher et al. |
| 8,417,854 B2 | 4/2013 | Weng et al. |
| 8,423,418 B2 | 4/2013 | Hald et al. |
| 8,424,058 B2 | 4/2013 | Vinogradov et al. |
| 8,433,664 B2 | 4/2013 | Ziegler et al. |
| 8,433,815 B2 | 4/2013 | van Coppenolle et al. |
| 8,438,132 B1 | 5/2013 | Dziuk et al. |
| 8,442,933 B2 | 5/2013 | Baier et al. |
| 8,442,999 B2 | 5/2013 | Gorelik et al. |
| 8,443,069 B2 | 5/2013 | Bagepalli et al. |
| 8,443,071 B2 | 5/2013 | Lu et al. |
| 8,457,996 B2 | 6/2013 | Winkler et al. |
| 8,458,189 B1 | 6/2013 | Ludwig et al. |
| 8,458,315 B2 | 6/2013 | Miche et al. |
| 8,458,596 B1 | 6/2013 | Malks et al. |
| 8,458,600 B2 | 6/2013 | Dheap et al. |
| 8,473,317 B2 | 6/2013 | Santoso et al. |
| 8,478,861 B2 | 7/2013 | Taylor et al. |
| 8,484,156 B2 | 7/2013 | Hancsarik et al. |
| 8,489,527 B2 | 7/2013 | van Coppenolle et al. |
| 8,490,047 B2 | 7/2013 | Petschnigg et al. |
| 8,490,876 B2 | 7/2013 | Tan et al. |
| 8,495,072 B1 | 7/2013 | Kapoor et al. |
| 8,495,511 B2 | 7/2013 | Redpath |
| 8,495,683 B2 | 7/2013 | van Coppenolle et al. |
| 8,516,296 B2 | 8/2013 | Mendu |
| 8,516,383 B2 | 8/2013 | Bryant et al. |
| 8,521,621 B1 | 8/2013 | Hetzer et al. |
| 8,522,217 B2 | 8/2013 | Dutta et al. |
| 8,522,341 B2 | 8/2013 | Nochta et al. |
| 8,532,008 B2 | 9/2013 | Das et al. |
| 8,533,660 B2 | 9/2013 | Mehr et al. |
| 8,538,799 B2 | 9/2013 | Haller et al. |
| 8,543,568 B2 | 9/2013 | Wagenblatt |
| 8,547,838 B2 | 10/2013 | Lee et al. |
| 8,549,157 B2 | 10/2013 | Schnellbaecher |
| 8,555,248 B2 | 10/2013 | Brunswig et al. |
| 8,560,636 B2 | 10/2013 | Kieselbach |
| 8,560,713 B2 | 10/2013 | Moreira Sa de Souza et al. |
| 8,566,193 B2 | 10/2013 | Singh et al. |
| 8,571,908 B2 | 10/2013 | Li et al. |
| 8,572,107 B2 | 10/2013 | Fan et al. |
| 8,577,904 B2 | 11/2013 | Marston |
| 8,578,059 B2 | 11/2013 | Odayappan et al. |
| 8,578,328 B2 | 11/2013 | Kamiyama et al. |
| 8,578,330 B2 | 11/2013 | Dreiling et al. |
| 8,584,082 B2 | 11/2013 | Baird et al. |
| 8,588,765 B1 | 11/2013 | Harrison |
| 8,594,023 B2 | 11/2013 | He et al. |
| 8,635,254 B2 | 1/2014 | Harvey et al. |
| 8,689,181 B2 | 4/2014 | Biron, III |
| 8,752,074 B2 | 6/2014 | Hansen |
| 8,762,497 B2 | 6/2014 | Hansen |
| 8,769,095 B2 | 7/2014 | Hart et al. |
| 8,788,632 B2 | 7/2014 | Taylor et al. |
| 8,898,294 B2 | 11/2014 | Hansen |
| 9,002,980 B2 | 4/2015 | Shedrinsky |
| 9,003,478 B2 * | 4/2015 | Kavantzas ............ H04L 63/10 713/1 |
| 2002/0099454 A1 | 7/2002 | Gerrity |
| 2002/0138596 A1 | 9/2002 | Darwin et al. |
| 2003/0093710 A1 | 5/2003 | Hashimoto et al. |
| 2003/0117280 A1 | 6/2003 | Prehn |
| 2004/0027376 A1 | 2/2004 | Calder et al. |
| 2004/0122861 A1 | 6/2004 | Hulse et al. |
| 2004/0133635 A1 | 7/2004 | Spriestersbach et al. |
| 2004/0158455 A1 | 8/2004 | Spivack et al. |
| 2004/0158629 A1 | 8/2004 | Herbeck et al. |
| 2004/0168115 A1 | 8/2004 | Bauernschmidt et al. |
| 2004/0177124 A1 | 9/2004 | Hansen |
| 2005/0015369 A1 | 1/2005 | Styles et al. |
| 2005/0021506 A1 | 1/2005 | Sauermann et al. |
| 2005/0027675 A1 | 2/2005 | Schmitt et al. |
| 2005/0060186 A1 | 3/2005 | Blowers et al. |
| 2005/0102362 A1 | 5/2005 | Price et al. |
| 2005/0108418 A1 | 5/2005 | Bedi et al. |
| 2005/0198137 A1 | 9/2005 | Pavlik et al. |
| 2005/0213563 A1 | 9/2005 | Shaffer et al. |
| 2005/0240427 A1 | 10/2005 | Crichlow |
| 2005/0278692 A1 * | 12/2005 | Sridhar ............ G06F 8/20 717/106 |
| 2005/0289154 A1 | 12/2005 | Weiss et al. |
| 2006/0186986 A1 | 8/2006 | Ma et al. |
| 2006/0208871 A1 | 9/2006 | Hansen |
| 2007/0005736 A1 | 1/2007 | Hansen et al. |
| 2007/0016557 A1 | 1/2007 | Moore et al. |
| 2007/0027854 A1 | 2/2007 | Rao et al. |
| 2007/0027914 A1 | 2/2007 | Agiwal |
| 2007/0118844 A1 * | 5/2007 | Huang ............ G06F 9/465 719/330 |
| 2007/0130541 A1 | 6/2007 | Louch et al. |
| 2007/0162486 A1 | 7/2007 | Brueggemann et al. |
| 2007/0174158 A1 | 7/2007 | Bredehoeft et al. |
| 2007/0260593 A1 | 11/2007 | Delvat |
| 2007/0266384 A1 | 11/2007 | Labrou et al. |
| 2007/0300172 A1 | 12/2007 | Runge et al. |
| 2008/0098085 A1 | 4/2008 | Krane et al. |
| 2008/0140705 A1 | 6/2008 | Luo |

(56) References Cited

U.S. PATENT DOCUMENTS

| | | | |
|---|---|---|---|
| 2008/0147835 A1* | 6/2008 | Chandra | G06F 9/5038 709/223 |
| 2008/0172632 A1 | 7/2008 | Stambaugh | |
| 2008/0208890 A1 | 8/2008 | Milam | |
| 2008/0216050 A1* | 9/2008 | Behrendt | G06F 8/00 717/104 |
| 2008/0222599 A1 | 9/2008 | Nathan et al. | |
| 2008/0231414 A1 | 9/2008 | Canosa | |
| 2008/0244077 A1 | 10/2008 | Canosa | |
| 2008/0244594 A1 | 10/2008 | Chen et al. | |
| 2008/0255782 A1 | 10/2008 | Bilac et al. | |
| 2008/0288547 A1* | 11/2008 | Brodsky | G06F 17/3089 |
| 2008/0288956 A1* | 11/2008 | Videlov | G06F 17/3089 719/313 |
| 2008/0295117 A1* | 11/2008 | Videlov | G06F 9/546 719/328 |
| 2008/0319947 A1 | 12/2008 | Latzina et al. | |
| 2009/0006391 A1 | 1/2009 | Ram | |
| 2009/0150431 A1 | 6/2009 | Schmidt et al. | |
| 2009/0193148 A1 | 7/2009 | Jung et al. | |
| 2009/0259442 A1 | 10/2009 | Gandikota et al. | |
| 2009/0265705 A1 | 10/2009 | Wei | |
| 2009/0265760 A1 | 10/2009 | Zhu et al. | |
| 2009/0271778 A1 | 10/2009 | Mandyam et al. | |
| 2009/0299990 A1 | 12/2009 | Setlur et al. | |
| 2009/0300060 A1 | 12/2009 | Beringer et al. | |
| 2009/0300528 A1 | 12/2009 | Stambaugh | |
| 2009/0319518 A1 | 12/2009 | Koudas et al. | |
| 2009/0327337 A1 | 12/2009 | Lee et al. | |
| 2010/0017379 A1 | 1/2010 | Naibo et al. | |
| 2010/0017419 A1 | 1/2010 | Francis et al. | |
| 2010/0037168 A1* | 2/2010 | Thayne | G06F 17/24 715/769 |
| 2010/0064277 A1 | 3/2010 | Baird et al. | |
| 2010/0077001 A1 | 3/2010 | Vogel et al. | |
| 2010/0077456 A1 | 3/2010 | Drive et al. | |
| 2010/0094843 A1 | 4/2010 | Cras | |
| 2010/0125584 A1 | 5/2010 | Navas | |
| 2010/0125826 A1 | 5/2010 | Rice et al. | |
| 2010/0138865 A1 | 6/2010 | Rai et al. | |
| 2010/0250440 A1 | 9/2010 | Wang et al. | |
| 2010/0257242 A1 | 10/2010 | Morris | |
| 2010/0286937 A1 | 11/2010 | Hedley et al. | |
| 2010/0287075 A1 | 11/2010 | Herzog et al. | |
| 2010/0293360 A1 | 11/2010 | Schoop et al. | |
| 2010/0318370 A1* | 12/2010 | Bhattacharyya | H04L 41/0273 705/1.1 |
| 2011/0078599 A1 | 3/2011 | Guertler et al. | |
| 2011/0078600 A1 | 3/2011 | Guertler et al. | |
| 2011/0099190 A1 | 4/2011 | Kreibe | |
| 2011/0106615 A1* | 5/2011 | Churchill | G06Q 30/0251 705/14.49 |
| 2011/0137883 A1 | 6/2011 | Lagad et al. | |
| 2011/0138354 A1 | 6/2011 | Hertenstein et al. | |
| 2011/0145712 A1 | 6/2011 | Pontier et al. | |
| 2011/0145933 A1 | 6/2011 | Gambhir et al. | |
| 2011/0153505 A1 | 6/2011 | Brunswig et al. | |
| 2011/0154226 A1 | 6/2011 | Guertler et al. | |
| 2011/0161409 A1 | 6/2011 | Nair et al. | |
| 2011/0173203 A1 | 7/2011 | Jung et al. | |
| 2011/0173220 A1 | 7/2011 | Jung et al. | |
| 2011/0173264 A1 | 7/2011 | Kelly | |
| 2011/0208788 A1 | 8/2011 | Heller et al. | |
| 2011/0209069 A1 | 8/2011 | Mohler | |
| 2011/0219327 A1 | 9/2011 | Middleton, Jr. et al. | |
| 2011/0231592 A1 | 9/2011 | Bleier et al. | |
| 2011/0270959 A1* | 11/2011 | Schlusser | H04L 67/10 709/223 |
| 2011/0276360 A1 | 11/2011 | Barth et al. | |
| 2011/0307295 A1 | 12/2011 | Steiert et al. | |
| 2011/0307363 A1 | 12/2011 | N et al. | |
| 2011/0307405 A1 | 12/2011 | Hammer et al. | |
| 2011/0320525 A1 | 12/2011 | Agarwal et al. | |
| 2012/0005577 A1 | 1/2012 | Chakra et al. | |
| 2012/0059856 A1 | 3/2012 | Kreibe et al. | |
| 2012/0072435 A1 | 3/2012 | Han | |
| 2012/0072885 A1 | 3/2012 | Taragin et al. | |
| 2012/0078959 A1 | 3/2012 | Cho et al. | |
| 2012/0096073 A1* | 4/2012 | Elwood | G06F 9/44526 709/203 |
| 2012/0096429 A1 | 4/2012 | Desai et al. | |
| 2012/0131473 A1 | 5/2012 | Biron, III | |
| 2012/0136649 A1 | 5/2012 | Freising et al. | |
| 2012/0143970 A1 | 6/2012 | Hansen | |
| 2012/0144370 A1 | 6/2012 | Kemmler et al. | |
| 2012/0150859 A1 | 6/2012 | Hu | |
| 2012/0158825 A1* | 6/2012 | Ganser | G06F 17/3089 709/203 |
| 2012/0158914 A1 | 6/2012 | Hansen | |
| 2012/0166319 A1 | 6/2012 | Deledda et al. | |
| 2012/0167006 A1 | 6/2012 | Tillert et al. | |
| 2012/0173671 A1 | 7/2012 | Callaghan et al. | |
| 2012/0197488 A1 | 8/2012 | Lee et al. | |
| 2012/0197852 A1 | 8/2012 | Dutta et al. | |
| 2012/0197856 A1 | 8/2012 | Banka et al. | |
| 2012/0197898 A1 | 8/2012 | Pandey et al. | |
| 2012/0197911 A1 | 8/2012 | Banka et al. | |
| 2012/0239381 A1 | 9/2012 | Heidasch | |
| 2012/0239606 A1 | 9/2012 | Heidasch | |
| 2012/0254111 A1* | 10/2012 | Carmichael | G06F 17/30094 707/627 |
| 2012/0254825 A1 | 10/2012 | Sharma et al. | |
| 2012/0259932 A1 | 10/2012 | Kang et al. | |
| 2012/0278187 A1 | 11/2012 | Lunt | |
| 2012/0284259 A1 | 11/2012 | Jehuda | |
| 2012/0284686 A1* | 11/2012 | Sharrma | G06F 8/38 717/109 |
| 2012/0311501 A1 | 12/2012 | Nonez et al. | |
| 2012/0311526 A1 | 12/2012 | DeAnna et al. | |
| 2012/0311547 A1 | 12/2012 | DeAnna et al. | |
| 2012/0324066 A1 | 12/2012 | Alam et al. | |
| 2013/0006400 A1 | 1/2013 | Caceres et al. | |
| 2013/0036137 A1 | 2/2013 | Ollis et al. | |
| 2013/0054563 A1 | 2/2013 | Heidasch | |
| 2013/0060791 A1 | 3/2013 | Szalwinski et al. | |
| 2013/0067031 A1 | 3/2013 | Shedrinsky | |
| 2013/0067302 A1 | 3/2013 | Chen et al. | |
| 2013/0073969 A1 | 3/2013 | Blank et al. | |
| 2013/0080898 A1 | 3/2013 | Lavian et al. | |
| 2013/0110496 A1 | 5/2013 | Heidasch | |
| 2013/0110861 A1 | 5/2013 | Roy et al. | |
| 2013/0124505 A1 | 5/2013 | Bullotta et al. | |
| 2013/0124616 A1 | 5/2013 | Bullotta et al. | |
| 2013/0125053 A1 | 5/2013 | Brunswig et al. | |
| 2013/0132385 A1 | 5/2013 | Bullotta et al. | |
| 2013/0166563 A1 | 6/2013 | Mueller et al. | |
| 2013/0166569 A1 | 6/2013 | Navas | |
| 2013/0173062 A1 | 7/2013 | Koenig-Richardson | |
| 2013/0179565 A1 | 7/2013 | Hart et al. | |
| 2013/0185246 A1 | 7/2013 | Salloum et al. | |
| 2013/0185593 A1 | 7/2013 | Taylor et al. | |
| 2013/0185786 A1 | 7/2013 | Dyer et al. | |
| 2013/0191767 A1 | 7/2013 | Peters et al. | |
| 2013/0205277 A1 | 8/2013 | Seven et al. | |
| 2013/0207980 A1 | 8/2013 | Ankisettipalli et al. | |
| 2013/0211555 A1 | 8/2013 | Lawson et al. | |
| 2013/0246897 A1 | 9/2013 | O'Donnell | |
| 2013/0262641 A1 | 10/2013 | Zur et al. | |
| 2013/0275344 A1 | 10/2013 | Heidasch | |
| 2013/0275550 A1 | 10/2013 | Lee et al. | |
| 2013/0304581 A1 | 11/2013 | Soroca et al. | |
| 2014/0019432 A1 | 1/2014 | Lunenfeld | |
| 2014/0040863 A1* | 2/2014 | Hale | G06F 8/36 717/123 |
| 2014/0149561 A1 | 5/2014 | Bae et al. | |
| 2014/0157224 A1* | 6/2014 | Capuozzo | G06F 8/20 717/100 |
| 2014/0282370 A1 | 9/2014 | Schaefer et al. | |

(56) References Cited

U.S. PATENT DOCUMENTS

| | | | |
|---|---|---|---|
| 2015/0268936 A1 | 9/2015 | Huber et al. | |
| 2015/0269130 A1 | 9/2015 | Huber et al. | |
| 2015/0271272 A1 | 9/2015 | Mahoney et al. | |
| 2015/0334182 A1* | 11/2015 | Wu | H04L 67/1095 707/620 |

FOREIGN PATENT DOCUMENTS

| | | |
|---|---|---|
| WO | WO-99/21152 A1 | 4/1999 |
| WO | WO-00/77592 A2 | 12/2000 |
| WO | WO-2008/115995 A1 | 9/2008 |
| WO | WO-2014/145084 A1 | 9/2014 |

OTHER PUBLICATIONS

Phillippe Mougin, Web Services, Business Objects and Component Models, 2001, pp. 3-39.*
William Sellick, RGU Honours Project (Soft Real-time Data Viewer using WITSML), 2008, pp. 4-18.*
SAP, SAP Business Objects Data Services, 2009, pp. 24-92.*
International Search Report, PCT/US2015/021894, 4 pages, Aug. 5, 2015.
Written Opinion, PCT/US2015/021894, 18 pages, Aug. 5, 2015.
Shi, L. et al., Understanding Text Corpora with Multiple Facets, IEEE Symposium on Visual Analytics Science and Technology (VAST), 99-106 (2010).
Hart Server, retrieved from 2001 internet archive of hartcomm.org http://www.hartcomm.org/server2/index.html, 13 pages (2001).
Ray, Erik T., Learning XML, First Edition, 277 pages (2001).

* cited by examiner

SYSTEM AND METHOD FOR DEVELOPING REAL-TIME WEB-SERVICE OBJECTS

FIELD OF THE INVENTION

The invention relates generally to systems and methods for application development for a computing device. More particularly, in certain embodiments, the invention relates to developing real-time Web-service objects for executing on an computing application.

BACKGROUND

Real-time Web development generally refers to the making and testing of software applications that consume or receive Web data and Web services as they become available, rather than requiring a user or the software to check a source periodically for updates. Real-time Web-services and data may include social feed (such as Twitter), Web chat services, live charts, on-screen dashboards, activity streams, and real-time Web analytics. Real-time Web services and data may also include functions performed by enterprise back-office operations, such CRM/ERP, OSSm, among others. A Web application or "Web App" is any application software that runs in a Web browser or is created in a browser-supported programming language (such as the combination of JavaScript, HTML and CSS) and relies on a common Web API to render the application.

One type of such Web application is a Mashup, which generally is a Web page or Web application that uses content from more than one source to create a new service displayed in a graphical user interface. Mashup may be employed for business applications, consumer applications, and industrial applications. A Mashup may use application programming interfaces (APIs) of different vendors to use their site's content as well as the site's aggregated and reused content.

Heterogeneous development generally refers to using hardware and software from different vendors. Because of available selections of competing standards and platforms offered by various vendors, application developers typically have to test a given application using multiple devices operating a number of competing platforms and standards. These tests may be in relation to the operating systems, the communication networks, and/or the data storage.

Testing across multiple platforms is still performed for the most part, manually. For example, in order to test the interactions of a Web application across various types of devices in a heterogeneous environment, an application developer has to individually update the client-side Web application on each of the devices.

Web development and application-development tools have been around for some time. Application libraries and toolkits have been developed that enable application developers to easily integrate data and functions. Nevertheless, there is a still a need for better tools to make application development more efficient and quick. There additionally exists a need for a solution that allows for testing code of new classes of Web objects that employ Real-time data and services.

SUMMARY

In general overview, an intermediary party provides an application developer with a development platform for building a client-side computing-device application (e.g., a mobile application) that includes Mashup elements. The Mashup elements display contents that are aggregated from multiples sources.

In some implementations, the application developer accesses the development platform through a Web browser running on a computing device. The development platform hosts a Web-based development workspace that is executed from the development platform managed by the intermediary party. The Web-based development workspace includes a Mashup template library directed to building the client-side application. The Mashup template library includes a list of Mashup templates to which a given application developer can instantiate within the development workspace to produce the Mashup elements to execute in the client-side application.

In some implementations, the development platform maintains data content to be used by the Mashup elements. The data content may include test data as well as third-party Web data and services accessible to the development platform. In some implementations, the development platform may reproduce some of the Web data within its own data storage. In some implementations, the development platform may interface to a data warehouse having data curated by the intermediary party and made available within the intermediary-party's local network.

To this end, the application developer has access, within the Web-based development workspace, to both the building elements (e.g., Mashup templates) and well as the content data to populate instances of the building elements in which the content data includes real-time data and services intended for use during run-time production.

To improve the development speed of the developer's client-side-application project, the Web-based development workspace, in some implementations, provides a function to test the client-side application over multiple test computing-devices, collectively, forming a heterogeneous environment. To this end, an application developer, during development of their client-side application, can centrally manage and test the user interface and the data interaction to identify any unexpected behaviors from, for example, the operating system and software native to each of the test devices. In some implementations, each of the test devices may run an operating system of a different vendor.

Furthermore, to reduce the testing time of a prototype client-side application, in some implementations, the Web-based development workspace includes a function that updates a given prototype client-side application without requiring the application developer to physically touch any of the test devices to initiate the update nor to configure the test devices to be in test mode. In some implementations, the application developer merely has to subscribe to the client-side application at each of the test devices. In some implementations, the application developer may choose, within the Web-based development workspace, whether the function merely causes the test device to download the updated client-side application or causes the device to both download and execute the updated application.

Furthermore, for reducing the testing time of a client-side application having Mashup elements, in some implementations, the development platform allows for a given updated client-side application to retain the last view being displayed on a given test device before the update had occurred. In some implementations, the retention includes a given navigable screen as well as various presentation states of each of the Mashup elements that may be presented on that particular screen.

In some implementations, the content data may include metadata information associated with a given data content. The client-side application may employ such metadata information to ascertain a current viewable state of any given Mashup elements to which the viewable state has a hierarchical relationship corresponding to the structure of the data content. In some implementations, the metadata information and the data content may be structured in a self-describing message format in which the metadata information is a part of the data content. The metadata information may be employed to describe one or more data of a given message organized as a multi-level hierarchy. In some implementations, the multi-level hierarchy message may directly map to the rendering widgets executing at the client-side application.

To improve or enhance an end user's experience in browsing data on the client-side application during runtime, the client-side application may cache data and code objects to allow usage of the client-side application when connectivity to the content sources is not present. In some implementations, the development platform may send content data for multiple viewable states. To this end, the content data may be structured such that a single service call to the content source results in a record set of the content data that can be used to view all states of the Mashup element during runtime.

To reduce the development time to create application having such user-experience improvement features, the development platform may be configured with functions to centrally manage the mechanisms when the updates are executed at the client-side application. In some implementations, the development platform may generate a list of all contents for a given distribution of the update. In some implementations, the list is recorded in an update manifest file. The development form may generate the list using an associations made between various presentation and content objects during the development of the client-side application. The association is preferably made without an application developer having to make such explicit definitions. In essence, the development platform allows individual actions by an application developer to produce multiple effects to the end application.

Applications for the systems and methods described herein are not limited to the aforementioned examples, but may be deployed in any number of contexts, as would be understood by one of ordinary skill in the art. Contents of the background are not to be considered as an admission of the contents as prior art.

In one aspect, the present disclosure describes a method of developing real-time Web application for multiple platforms in a heterogeneous environment. A development workspace for a set of Webpage definition files for running on one or more of client-side applications may be provided. The development workspace may combine composite Web-service objects to create the set of Webpage definition files. The client-side applications may be configured to run on a set of connected platforms composing a heterogeneous environment. Composite Web-service objects may include Widgets elements and Mashup elements. The composite Web-service object may aggregate information content or services from a number of content sources. The composite Web-service object may include a content-source service selected from a group consisting of a map service, a calendar service, a data stream service, a wiki page service, and a portal service. A content source of the content sources may be selected from a group consisting of public Web-service API, a third-party Web-service API, a Web-widget library, a Web-toolkit library, a screen scraping of a Web-site, a local database, and a Wiki page. A portion of the content sources may include data associated to one or more connected devices composing an Internet of Things or a machine-to-machine system.

In some implementations, the method may include storing a set of modified Webpage definition files responsive to a save command being received by an input at the development workspace. The set of modified Webpage definition files may include at least one modification of at least one of the composite Web-service objects from a set of current Webpage definition files associated with a previous save command.

In some implementations, the method may include causing, by a processor responding to the save command, a message to be transmitted to each of the client-side applications executing on the set of connected platforms. In some implementations, the client-side application is executed within a Web-browser. The message may cause each of the client-side applications to receive the set of modified Webpage definition files to which the receiving occurs without any input by a user at the client-side application.

In some implementations, the method may include causing the client-side application to update the set of current Webpage definition files with the set of modified Webpage definition files upon receipt of the set of modified Webpage definition files. The updating may occur without any input by the user at the client-side application. The method may include causing the client-side application to display the last retained view being display prior to the update.

In some implementations, the set of Webpage definition files may be configured to produce a number of presentation states in the composite Web-service objects. The client-side applications may determine a current presentation state being displayed at the set of current Webpage definition files. During a new update distribution, the client-side application may update the set of modified Webpage definition files and traverse the presentation states to the same current presentation state.

In one aspect, the present disclosure describes a system including a processor and a memory, the memory storing instruction that, when executed by the processor, cause the processor to provide a development workspace for a set of Webpage definition files for running on one or more client-side applications. The development workspace may combine composite Web-service objects to create the set of Webpage definition files. The client-side applications may be configured to run on a set of connected platforms composing a heterogeneous environment. Composite Web-service objects may include Widgets elements and Mashup elements. The composite Web-service object may aggregate information content or services from a number of content sources. The composite Web-service object may include a content-source service selected from a group consisting of a map service, a calendar service, a data stream service, a wiki page service, and a portal service.

In some implementations, the instructions may further cause the processor to store a set of modified Webpage definition files responsive to a save command being received by an input at the development workspace. The set of modified Webpage definition files may include at least one modification of at least one of the composite Web-service objects from a set of current Webpage definition files associated with a previous save command.

In some implementations, the instructions may further cause a message to be transmitted to each of the client-side applications in response to the save command. In some implementations, the client-side application is executed within a Web-browser. The message may cause each of the client-side applications to receive the set of modified Webpage definition files to which receiving occurs without any input by a user at the client-side application.

In some implementations, the instructions may further cause the client-side application to update the set of current Webpage definition files with the set of modified Webpage definition files upon receipt of the set of modified Webpage definition files. The updating may occur without any input by the user at the client-side application. The method may include causing the client-side application to display the last retained view being display prior to the update.

In some implementations, the set of Webpage definition files may be configured to produce a number of presentation states in the composite Web-service objects. The client-side applications may determine a current presentation state being displayed at the set of current Webpage definition files. During a new update distribution, the client-side application may update the set of modified Webpage definition files and traverse the presentation states to the same current presentation state.

In one aspect, the present disclosure describes a non-transitory computer readable medium having instructions stored thereon, where the instructions, when executed by a processor, cause the processor to provide a development workspace for a set of Webpage definition files for running on one or more client-side applications. The development workspace may combine one or more composite Web-service objects to create the set of Webpage definition files. The client-side applications may be configured to run on a set of connected platforms composing a heterogeneous environment. The composite Web-service objects may include Widgets elements and/or Mashup elements. The composite Web-service object may aggregate information content or services from a number of content sources. The composite Web-service object may include a content-source service selected from a group consisting of a map service, a calendar service, a data stream service, a wiki page service, and a portal service.

In some implementations, the instructions may further cause the processor to store a set of modified Webpage definition files responsive to a save command being received by an input at the development workspace. The set of modified Webpage definition files may include at least one modification of at least one of the composite Web-service objects from a set of current Webpage definition files associated with a previous save command.

In some implementations, the instructions may further cause a message to be transmitted to each of the client-side applications in response to the save command. In some implementations, the client-side application is executed within a Web-browser. The message may cause each of the client-side applications to receive the set of modified Webpage definition files to which the receiving occurs without any input by a user at the client-side application.

In some implementations, the instructions may further cause the client-side application to update the set of current Webpage definition files with the set of modified Webpage definition files upon receipt of the set of modified Webpage definition files. The updating may occur without any input by the user at the client-side application. The method may include causing the client-side application to display the last retained view being display prior to the update.

In some implementations, the set of Webpage definition files, when executed on the client-side application, creates a number of presentation states of the composite Web-service objects. The client-side applications may determine a current presentation state being displayed at the set of current Webpage definition files. During a new update distribution, the client-side application may update the set of modified Webpage definition files and traverse the presentation states to the same current presentation state.

In one aspect, the present disclosure describes a method of updating software distribution at a client-side application. The method may include providing a client-side application running on a connected device in which the client-side application uses Webpage definition files to display one or more composite Web-service objects.

In some implementations, the method may include receiving updated Webpage definition files including an update of at least one composite Web-service object within the Webpage definition files where the composite Web-service objects includes a number of presentation states.

In some implementations, the method may include receiving, concurrent with the updated Webpage definition files, a structured data-table having content information to populate the presentation states of the at least one of the composite Web-service objects where the structured data-table comprises a set of markers.

In some implementations, for each of the composite Web-service objects being displayed, the method may include determining a path of the set of markers associated with a current presentation state In some implementations, the method may include updating the Webpage definition files with the updated composite Web-service objects.

In some implementations, the method may include displaying each of the updated composite Web-service objects of the updated Webpage definition files at the current presentation state using the determined marker path.

In one aspect, the present disclosure describes a method of operations at a client-side application. The method may include providing a client-side application running on a connected device. The client-side application may have a Webpage definition files. The Webpage definition files may have composite Web-service objects, including a first composite Web-service object and a second composite Web-service object, where the first composite Web-service object has been associatively linked to a first data service from a first data source, and the second composite Web-service object has been associative linked to a second data service from a second data source. The linking may have been made at a graphical user interface having an input represented as a wire diagram that links a first graphical widget representing the first composite Web-service object to a second graphical widget representing an API associated with the first data source.

In some implementations, the method may include receiving, during runtime of the client-side application, a first updated data content of the first data service from the first data source. The first updated data content may be listed in a manifest file. Examples of the first updated data content may include, for example, but not limited to, JavaScript object, an HTML object, an image, a Web-Mashup definition, and a Web-Mashup artifact.

In some implementations, the method 1100 may include caching the first updated data content in memory if other files in the manifest file are not present.

In some implementations, the method may include, upon receiving a second updated data content of the second data service from the second data source, retrieving the first updated data content from memory and updating the composite Web-service objects of the Webpage definition files with the first and second update data contents. Updates of the composite Web-service objects may be performed in a transactional manner.

At least one of the composite Web-service objects may include a presentation states, including a first state and a second state in which the first state had been associatively linked to a third data service from a third data source and the second state had been associatively linked to a fourth data service from a fourth data source. The update occurs only upon a third update of the third data service and a fourth update of the fourth data service being received.

In one aspect, the present disclosure describes a system including a processor and a memory, the memory storing instruction that, when executed by the processor, cause the processor to provide a client-side application running on a connected device. The client-side application may have a number of Webpage definition files. The Webpage definition files may have a number of composite Web-service objects, including a first composite Web-service object and a second composite Web-service object, where the first composite Web-service object has been associatively linked to a first data service from a first data source, and the second composite Web-service object has been associative linked to a second data service from a second data source. The linking may have been made at a graphical user interface having an input represented as a wire diagram that links a first graphical widget representing the first composite Web-service object to a second graphical widget representing an API associated with the first data source.

In some implementations, the instructions may further cause the processor to receive, during runtime of the client-side application, a first updated data content of the first data service from the first data source. The first updated data content may be listed in a manifest file. Examples of the first updated data content may include, for example, but not limited to, JavaScript object, an HTML object, an image, a Web-Mashup definition, and a Web-Mashup artifact.

In some implementations, the instructions may further cause the processor to cache the first updated data content in memory if other files in the manifest file are not present.

In some implementations, the instructions may further cause the processor to receive a second updated data content of the second data service from the second data source, retrieving the first updated data content from memory and updating the composite Web-service objects of the Webpage definition files with the first and second update data contents. Updates of the composite Web-service objects may be performed in a transactional manner.

In one aspect, the present disclosure describes a non-transitory computer readable medium having instructions stored thereon, where the instructions, when executed by a processor, cause the processor to execute a client-side application running on a connected device. The client-side application may have a number of Webpage definition files. The Webpage definition files may have a number of composite Web-service objects, including a first composite Web-service object and a second composite Web-service object, where the first composite Web-service object has been associatively linked to a first data service from a first data source, and the second composite Web-service object has been associative linked to a second data service from a second data source. The linking may have been made at a graphical user interface having an input represented as a wire diagram that links a first graphical widget representing the first composite Web-service object to a second graphical widget representing an API associated with the first data source.

In some implementations, the instructions may further cause the processor to receive, during runtime of the client-side application, a first updated data content of the first data service from the first data source. The first updated data content may be listed in a manifest file. Examples of the first updated data content may include, for example, but not limited to, JavaScript object, an HTML object, an image, a Web-Mashup definition, and a Web-Mashup artifact.

In some implementations, the instructions may further cause the processor to cache the first updated data content in memory if other files in the manifest file are not present.

In some implementations, the instructions may further cause the processor to receive a second updated data content of the second data service from the second data source, retrieving the first updated data content from memory and updating the composite Web-service objects of the Webpage definition files with the first and second update data contents. Updates of the composite Web-service objects may be performed in a transactional manner.

In one aspect, the present disclosure describes a method of displaying hierarchical data at a client-side application executing on a computing device. The method may include providing a graphical user interface running at the client-side application. The graphical user interface may present one or more rendering widgets and an input widget having one or more levels where each of the one or more rendering widgets had been associated to one or more data content source. The graphical user interface may present the input widget as a tree diagram. The rendering widgets may have been associatively linked to one or more data content source at a development workspace used to define the rendering widget. The graphical user interface may include a map widget where the received data set include data for each of the levels of the input widget for the map widget. The received data set may be an InfoTable.

In some implementations, the method may include transmitting, at the client-side application, a request for a dataset corresponding to the data content source.

In some implementations, the method may include receiving, at the client-side application, the data set where the data set forms a multi-level hierarchy corresponding the one or more levels of the input widget and where the data set includes the one or more data content source associated with the rendering widgets.

In some implementations, the method may include displaying a selected rendering widgets with a data content source where the selected rendering widgets corresponds to a selected level of the input widget.

In some implementations, the method may further include receiving, at the client side application, an alert of an updated data set where the alert causes, at the client-side application, a transmission of a request for the updated data set. The method may further include receiving a second input at the input widget corresponding a second level of the input widget. The second input may cause the client-side application to render data from a portion of the multi-level hierarchy corresponding to the second level.

In one aspect, the present disclosure describes a system including a processor and a memory, the memory storing instruction that, when executed by the processor, cause the processor to provide a graphical user interface running at the client-side application. The graphical user interface may present one or more rendering widgets and an input widget having one or more levels where each of the one or more rendering widgets had been associated to one or more data content source. The graphical user interface may present the input widget as a tree diagram. The rendering widgets may have been associatively linked to one or more data content source at a development workspace used to define the rendering widget. The graphical user interface may include a map widget where the received data set include data for each of the levels of the input widget for the map widget. The received data set may be an InfoTable.

In some implementations, the instructions, when executed, further cause the processor to transmit, at the client-side application, a request for a dataset corresponding to the data content source.

In some implementations, the instructions, when executed, further cause the processor to receive, at the client-side application, the data set where the data set forms a multi-level hierarchy corresponding the one or more levels of the input widget and where the data set includes the one or more data content source associated with the rendering widgets.

In some implementations, the instructions, when executed, further cause the processor to display a selected rendering widgets with a data content source where the selected rendering widgets corresponds to a selected level of the input widget.

In some implementations, the instructions, when executed, further cause the processor to receive, at the client side application, an alert of an updated data set where the alert causes, at the client-side application, a transmission of a request for the updated data set. The method may further include receiving a second input at the input widget corresponding a second level of the input widget. The second input may cause the client-side application to render data from a portion of the multi-level hierarchy corresponding to the second level.

In one aspect, the present disclosure describes a non-transitory computer readable medium having instructions stored thereon, where the instructions, when executed by a processor, cause the processor to provide a graphical user interface running at the client-side application. The graphical user interface may present one or more rendering widgets and an input widget having one or more levels where each of the one or more rendering widgets had been associated to one or more data content source. The graphical user interface may present the input widget as a tree diagram. The rendering widgets may have been associatively linked to one or more data content source at a development workspace used to define the rendering widget. The graphical user interface may include a map widget where the received data set include data for each of the levels of the input widget for the map widget. The received data set may be an InfoTable.

In some implementations, the instructions, when executed, further cause the processor to transmit, at the client-side application, a request for a dataset corresponding to the data content source.

In some implementations, the instructions, when executed, further cause the processor to receive, at the client-side application, the data set where the data set forms a multi-level hierarchy corresponding the one or more levels of the input widget and where the data set includes the one or more data content source associated with the rendering widgets.

In some implementations, the instructions, when executed, further cause the processor to display a selected rendering widgets with a data content source where the selected rendering widgets corresponds to a selected level of the input widget.

In some implementations, the instructions, when executed, further cause the processor to receive, at the client side application, an alert of an updated data set where the alert causes, at the client-side application, a transmission of a request for the updated data set. The method may further include receiving a second input at the input widget corresponding a second level of the input widget. The second input may cause the client-side application to render data from a portion of the multi-level hierarchy corresponding to the second level.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

The features and advantages of the present disclosure will become more apparent from the detailed description set forth below when taken in conjunction with the drawings, in

DETAILED DESCRIPTION

Figure 1:
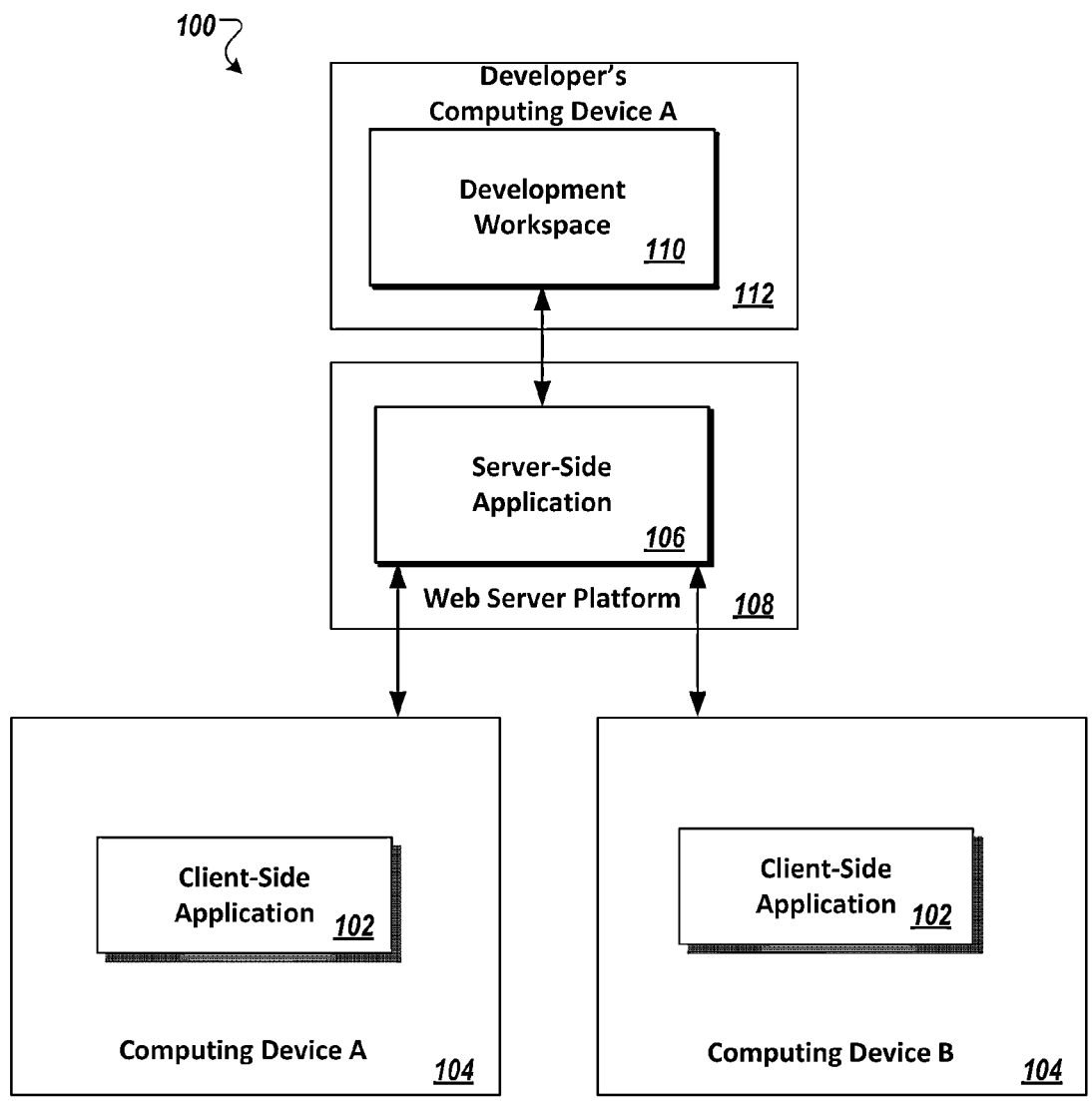
FIG. 1 is a block diagram of an example system for developing real-time Web applications for executing on a set of computing devices in accordance with an embodiment of the invention.

FIG. 1 is a block diagram of an example system 100 of developing real-time client-side Web applications 102 for executing on a set of computing devices 104 in accordance with an embodiment of the invention. The computing devices 104, in some examples, may be smart phones, personal digital assistants (PDA), tablet computers, or other personal electronic devices capable of the installation and execution of a software application designed to display one or more Mashup objects. Rather than mobile devices, in some implementations, the devices 104 may be desktop computers, laptop computers, Smart TVs, Internet appliances, or other computing devices capable of the installation and execution of a software application designed to display one or more Mashup objects.

In some implementations, the system 100 includes a server-side application 106 that executes on a Web server platform 108. The system 100 further includes a development workspace 110 that executes on a developer's computing device 112.

In some implementations, the development workspace 110 is a Web service or application that is presented on a Web browser executing on the developer's computing device 112 and is hosted by the server-side application 106. The development workspace 110 includes a graphical user interface for building a client-side application 102.

Figure 2:
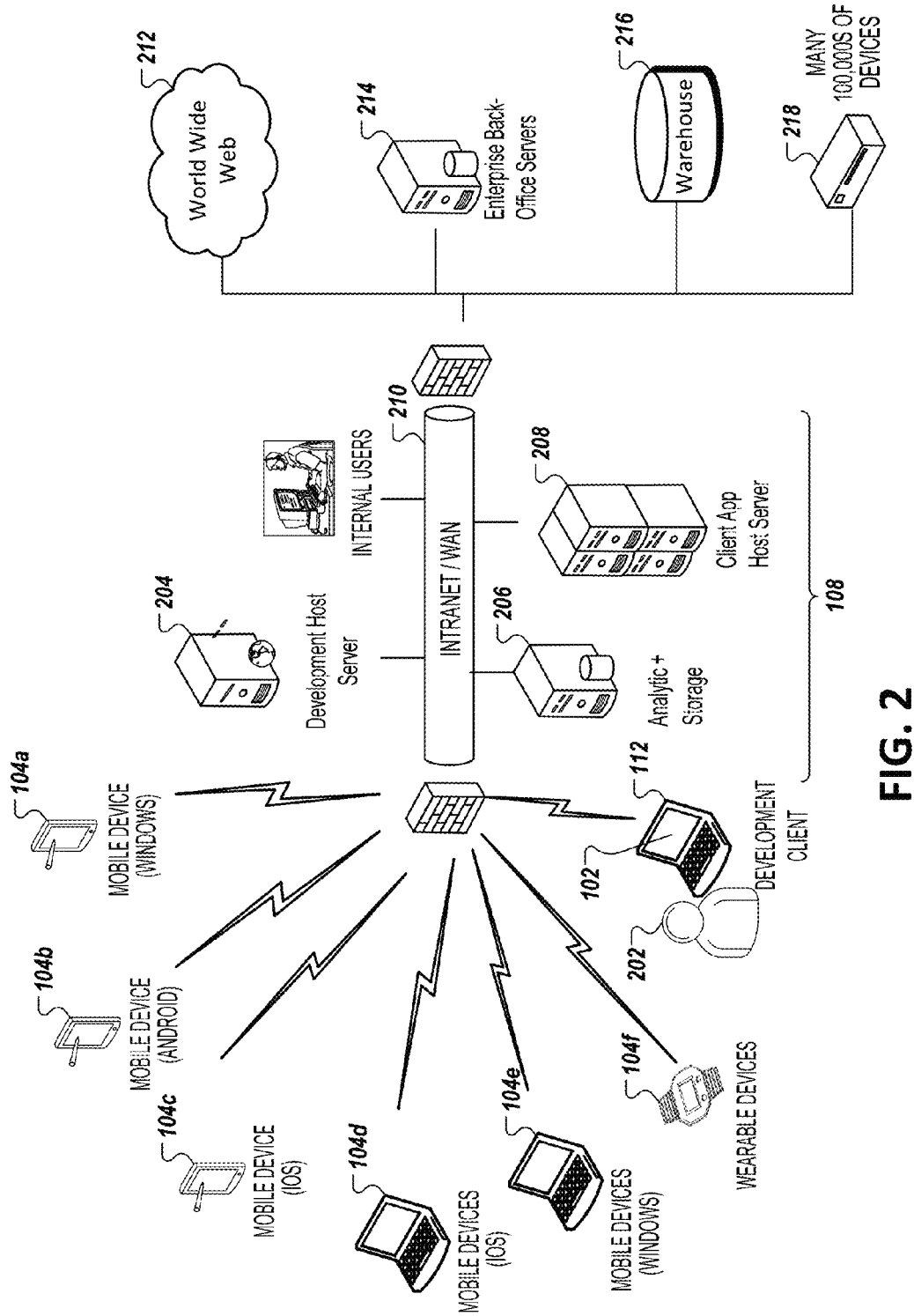
FIG. 2 is a block diagram of an example environment for developing real-time Web applications for executing on a set of computing devices in accordance with an embodiment of the invention.

FIG. 2 is a block diagram of an example environment 200 for developing real-time Web applications for executing on a set of computing devices 104 in accordance with an embodiment of the invention. As shown, the computing devices 104 include test devices 104a to 104f that collectively form a heterogeneous environment. For example, the devices 104a, 104b, 104c may be smart-phone mobile devices running different types of operating systems, such as Windows, Android, iOS, Windows Phone, Windows Mobile, Blackberry, Salifish OS, Ubuntu Touch, and Tizen. The devices 104d, 104e may be laptop mobile-devices running different types of operating systems. The device 104f may be wearable devices having Web browsing capabilities.

An application developer 202 may keep test devices 104a to 104f in proximity to the developer's computing device 112 during the development of the client-side application 102. To this end, the application developer 202 can centrally manage and test the user interfaces and the data interactions to identify any unexpected behaviors from, for example, the operating system and software native to each of the test devices 104a to 104f.

In some implementations, the Web server platform 108 provides the development workspace 110 to an application developer 202 on the developer's computing device 112 (also called a "development client 112"). In some implementations, the Web server platform 108 presents the development workspace 110 through a Web browser application executing natively on the development client 112. Examples of Web browser applications include Internet Explorer, Safari, Mozilla, and Google Chrome. In some implementations, the development workspace 110 may be a stand-alone software application that executes on the development client 112 that interfaces to the Web server platform 108.

In some implementations, the Web server platform 108 may provide various Web services to the client side applications 102 and the development workspace 110. For example, the Web server platform 108 may include a development host server 204, a data analytic and storage server 206, a client-side application host-server 208, collectively connected within an Intranet or Wide area network 210. The development host server 204 may provide Web hosting services for the development workspace 110. The client-application host-server 208 may host Web services for the client-side applications 102. The data analytics and storage server 206 may store and analyze data content for either the development host server 204 or the client-application host-server 208.

In some implementations, the Web server platform 108 connects to various data content-providers, Webpages 212, business entities 214, data centers 216, and device clusters 218 to retrieve data and information to be used by the client-side applications 102 and the server-side application 106. Such third party sources or self-curated sources may include content-source service, such as map service, a calendar service, a data stream service, a wiki page service, and a portal service. The content-source service may be accessible, for example, using public Web-service APIs, third-party Web-service APIs, Web-widget libraries, Web-toolkit libraries, screen scraping mechanisms of Web sites, local database, and Wiki pages.

In some implementations, the Web-server platform 108 may include servers and services relating to Internet of Things ("IOT") or machine-to-machine ("M2M" platforms that service data and information for a vast number of computing devices. Examples of such platforms are describe in co-pending application and concurrently filed U.S. patent applications, titled "SYSTEM AND METHOD OF MESSAGE ROUTING USING NAME-BASED IDENTIFIER IN A DISTRIBUTED COMPUTING ENVIRONMENT", filed Mar. 21, 2014, naming inventors Mike Mahoney, Bob DeRemer, and Rick Bullotta, and having Ser. No. 14/222,123. The application is incorporated herein by reference in its entirety.

Figure 3A:
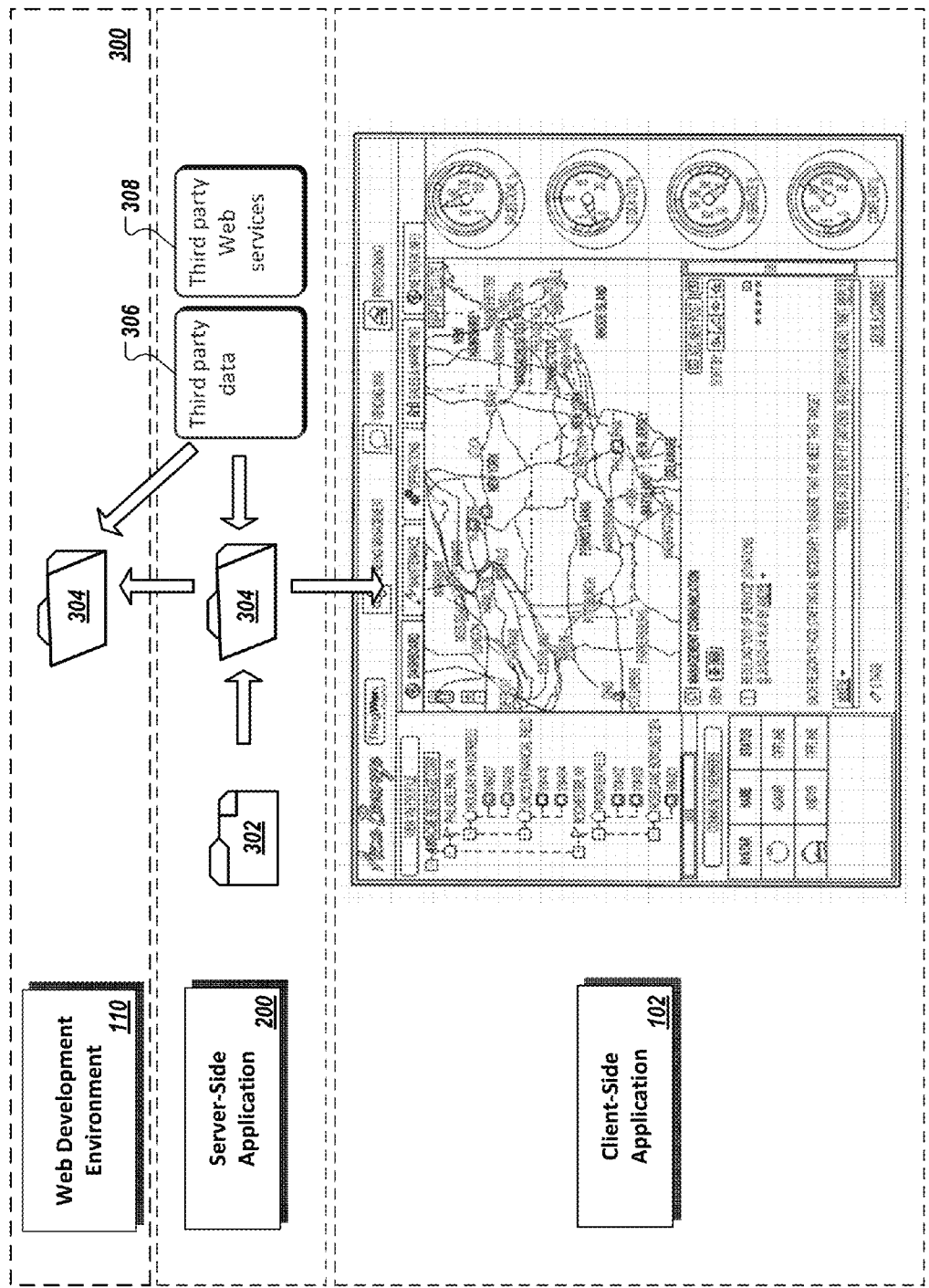
FIG. 3A illustrates an example method of building a real-time Web application that includes Mashup elements in accordance with an embodiment of the invention.

FIG. 3A illustrates an example method of building a real-time Web application that includes Mashup elements in accordance with an embodiment of the invention. An application developer 202 executes a browser session 300 on the developer's computing device 112 and accesses a Web portal hosted by the server-side application 200 that provides the development workspace 110. In some implementations, the development workspace 110 preferably includes a graphical user interface (GUI) to navigate sets of design and development libraries provided by the server side application 200 that an application developer 202 can use to build a client-side application 102. One such type of design libraries may include a Mashup template library.

In some implementations, subsequent to logging in, an application developer 202 registers to develop a new Web Mashup application. Upon starting a new Web Mashup project, the server-side application 200 creates a new Webpage definition file 302. The Webpage definition file 302 may include presentation and data elements to display a Webpage having Mashup element or real-time data content when the Webpage definition file 302 is executed at the client-side application 102. The Webpage definition file 302 may be stored in both the local memory at the development client 112 and the host memory at the Web server platform 108. The application developer can retrieve previously saved projects and Webpage definition files 302 from the development workspace 110.

In some implementations, as the application developer uses the development workspace 110 to incorporate third party contents and Web services in the project to build the client-side application, a modified Webpage definition file 304 is generated. In some implementations, the server-side application 200 generates the modified Webpage definition file 304, to run at the client-side application. The modified Webpage definition may also be previewed at the development workspace 110.

Figure 3B:
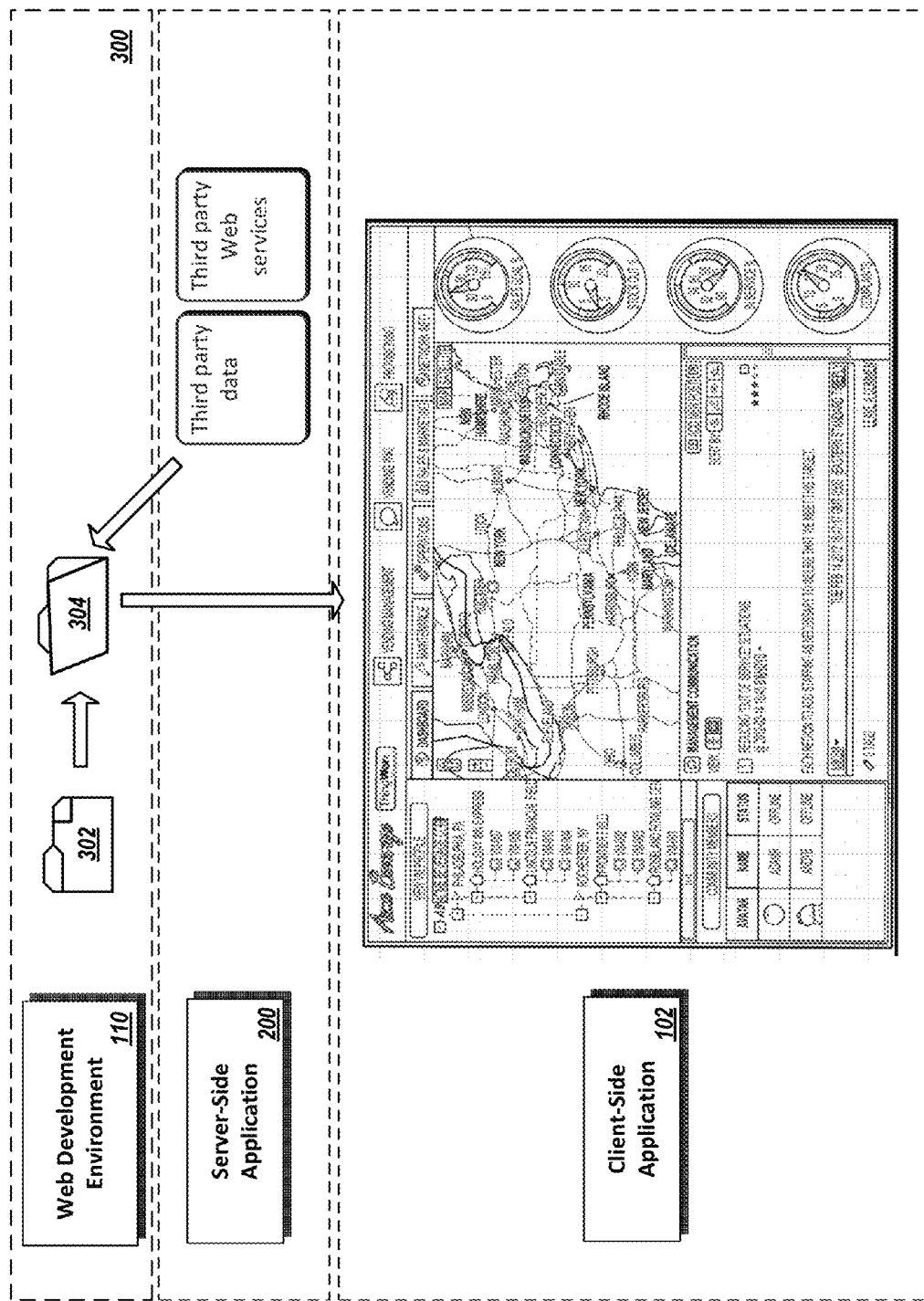
FIG. 3B illustrates an example method of building a real-time Web application that includes Mashup elements in accordance with an alternative embodiment of the invention.

Alternatively, as shown in FIG. 3B, upon starting a new Web Mashup project, the development workspace 110 creates the new Webpage definition file 302 and stores the files in local memory. The server-side application 200 may maintain a mirror copy of the Webpage definition file 302 at the platform server 108.

In an embodiment of the invention, to improve or enhance an end user's experience in browsing data on the client-side application during runtime, the client-side application may cache data and code objects to allow the usage of the client-side application when connectivity to the content sources is not present.

Figure 3C:
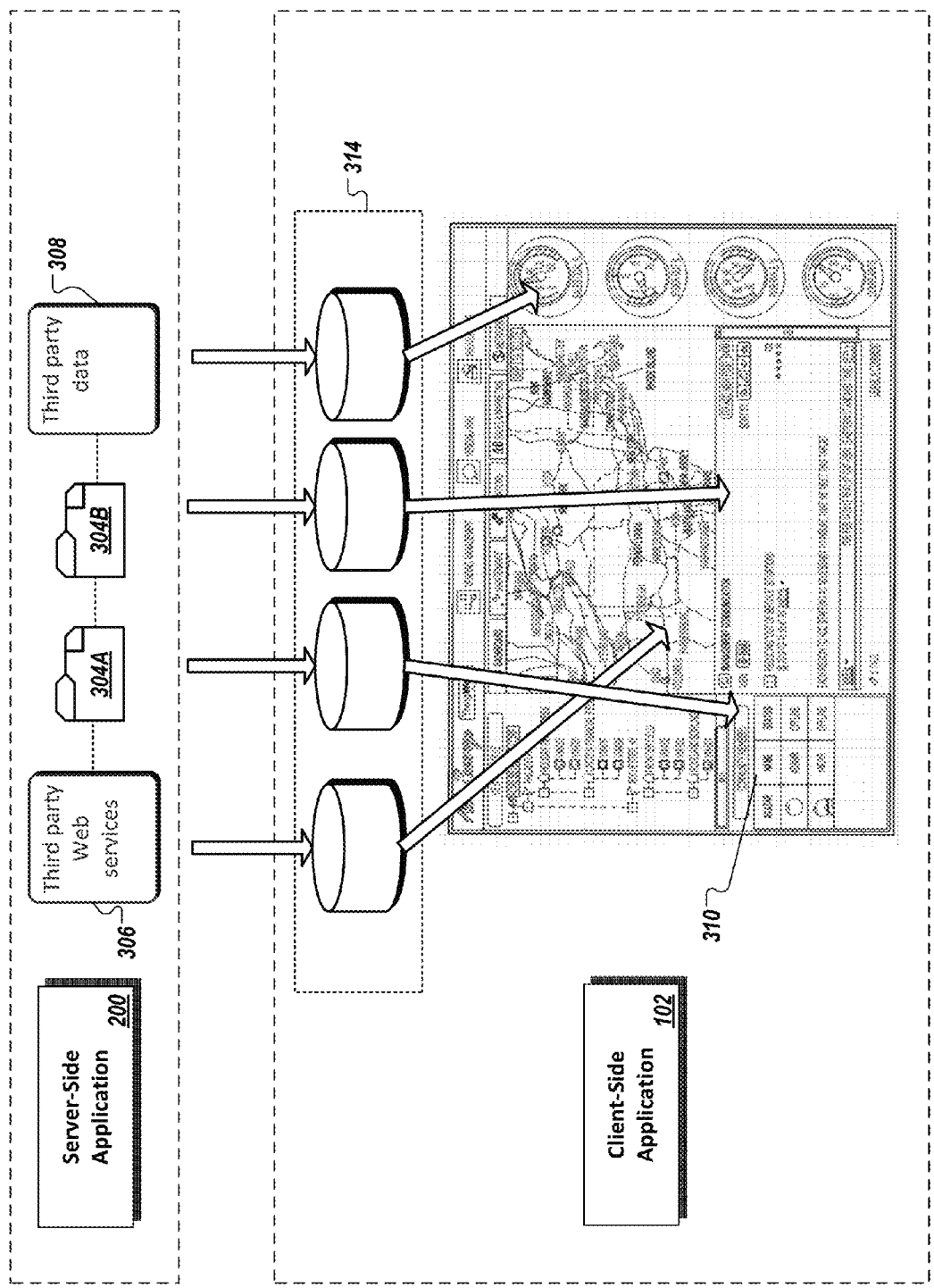
FIG. 3C illustrates an example method of caching Mashup elements at the real-time Web application during runtime in accordance with an embodiment of the invention.

FIG. 3C illustrates an example method of caching Mashup elements at the real-time Web application during runtime in accordance with an embodiment of the invention.

The client-side application 102 caches the Webpage definition files and the associated linked data content within the local memory or buffer 314.

To prevent the unintended interactions of various executable or parse-able elements, the client-side computing-device application 102 may cache the Webpage definitions files and all the data associatively linked to the Webpage definitions files and ensure that all the files and data content are present before rendering the data and code content.

To designate the appropriate content to cache, in some implementations, the development workspace may use the associative-links that were explicitly made in generating the Webpage definitions to generate a list of contents for a given update of the application distribution. The list of contents may be recorded in an update manifest file. For example, during development, the Webpage definitions files 304A and 304B may have been associatively linked to one another and to the third-party Web services 308 and to the third party data 306. To this end, the development workspace may add these files 304A and 304B, the third party Web service 308 and the data content 306 to the manifest list.

In some implementations, the server side application 200 may use the manifest file to ensure that all the updated Webpage definition files 304 and the associated linked data content are concurrently provided, during runtime, to the client-side application 102. To this end, the server-side application 200 maintains a definition of such associative links. During runtime, the server-side application 200 may transmit the data contents 306 and 308 to the client-side application 102 as well as the Webpage definition files 304A and 304B.

Figure 4:
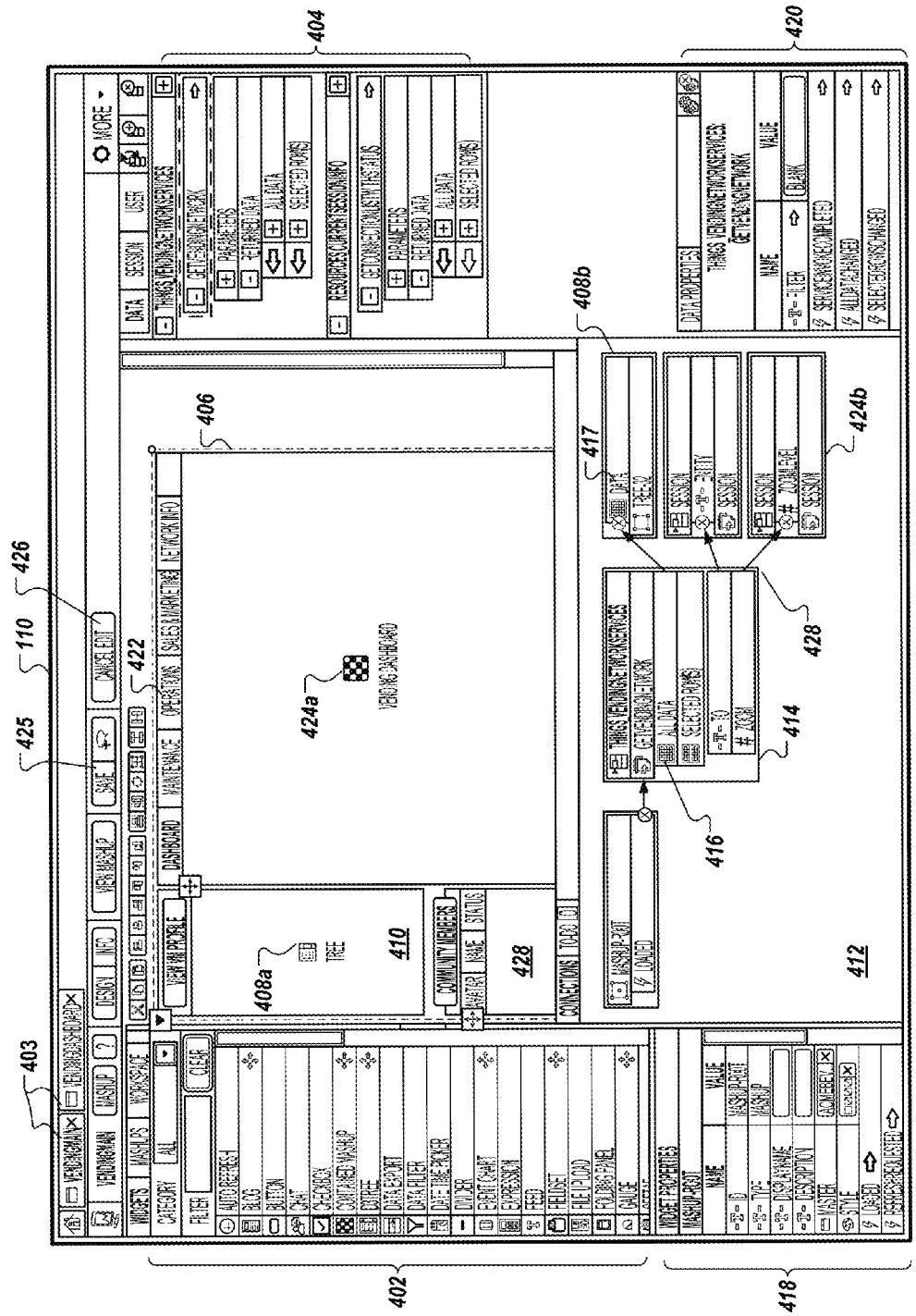
FIG. 4 illustrates an example workspace environment to build a real-time Web application that includes Mashup elements in accordance with an embodiment of the invention.

FIG. 4 illustrates an example development workspace 110 to build a real-time Web application that includes Mashup elements in accordance with an embodiment of the invention. The development workspace 110 may be a Web application or a computing application executed in a desktop operating system. The development workspace 110 may build the Mashup elements by aggregating multiple Web-services (including third party APIs) and data sources. The data content may be combined or manipulated to create new services within the development workspace 110.

Mashups may be imported, manipulated, and displayed using Widgets that display a physical element that consumes a data content element. To this end, the Widgets may be defined by the physical elements, the data content element, and their associations.

In some implementations, the development workspace 110 includes a set of widget components 402 and a set of data components 404 that collectively serve as tools for building the client-side application 102. The widget components 402 may include, for example, but not limited to, functions represented in a graphical form that can be dragged into a first development workspace 406. These functions may be GUI widgets (such as buttons, check boxes, gauges, etc.), as well as the Mashup widgets, and programming operations (such as a file upload function, a data export function, an expression function, among others). The GUI widgets may serve as definitions of the presentation elements to be displayed at the client-side application 102 during runtime. The Mashup widgets may include a Blog, a "contained" Mashup, a multi-dimensional tree, an event chart, a gauge, etc. The widget component 402 tools may include a filter or a search function to allow searching of the list of available components.

Upon a given widget component 408 (here, shown as a "tree" table 408a) being "dragged and dropped" from the widget components 402 into the first development workspace 406, a first representation 408a of the widget appears in the first workspace 406, and a second representation 408b appears in a second development workspace 412.

In some implementations, the first representation 408a is defined within a framed workspace 410 to which the size and location of the workspace 410 provides a spatial definition of the widget 408. Various presentation and appearance properties of the Widget 408 may be modified at the widget-properties window 418.

In some implementations, the second representation 408b provides a data content definition of the widget 408. Various data properties of the Widget 408 may be modified or set at the data properties window 420.

Data component 414 may also be "dragged and dropped" from the data components 404 into the second development workspace 412. The data component 414 serves as a source of the data content that is accessible to the server-side application 200 that a given developer has permission to access. The data component 414 shows available data 416 associated with a given data source. The data component 414 serves as definitions of the data content elements to be employed at the client-side application 102 during runtime. To this end, the second development workspace 412 allows the application developer 202 to link or associate the property definitions of a Widget (include Mashup) with the definitions for the data content elements of the Widget.

In some implementations, the link is preferably a rope object connecting between the data component 414 and the Widget component, such as widget 408. This link may be based on an association of two or more widgets. The link may be based on the data exchanged. The link may be based on the direction of the message or event. The link may be based on a property, such as a user name, a social networking aspect, or a frequency associated with the update.

As shown, a given element 416 ("ALL DATA") of the data component 414 ("THINGS VENDING NETWORK SERVICES") is linked to an elements 417 ("DATA" of "TREE-32") of the Widget object 408b. The elements 416 includes an icon and/or text to provide an indicia of the type of data available with the element. Similarly, the Widget-object element includes icons and/or text to provide an indicia of the type of data that it can consume. In some implementations, the development workspace 110 may restrict the connections between mismatched data types. In some implementations, the development workspace 110 may highlight allowable connections when a data component element or a Widget object is selected in the second development workspace.

In some implementations, the linkages and association made in the workspace 110 may be used to designate contents for the a manifest file that may be used to cache the updates of modified Mashup applications or cache the code and contents for run-time operations at the client-side application, as described in relation to FIG. 3C.

The development workspace 110 includes a save command 425. The save command 425 saves the content of the first development workspace 406 and the second development workspace 412. The content may be stored locally at the development workspace 110 and/or at the server-side application 200.

In some implementations, the save command 425 initiates a wrapper creation process to convert the physical elements and the data content elements defined within the workspace 406, 412 to a Webpage definition file. The Webpage definition file may be expressed in one or more browser or server supported programming language and/or code. An example may be JavaScript, HTML CSS, and/or combinations thereof. The Webpage definition file may be expressed in various dynamic language, such as, but not limited to, Perl, VBScript, Dart, PHP, ASP, .NET, ColdFusion, Ruby, Python, and TKL. In some implementations, adding a widgets component 402 and/or a data component 404 into the workspaces 406 and/or 412 may initiate the wrapper creation process.

In some implementations, the development workspace 110 includes a "cancel edit" command 426. The command 426 may undo all the modification to the workspace 406 since the previous save. Alternatively the command 426 may cause the previously saved workspace 406 to be loaded, such as from local memory or from the server-side application 200.

Other widget components 402 shown in FIG. 4 include a Mashup for status of "community members" 428. The status may provide a real-time list of members that may be using the client-side application 102 during run time. In some implementations, the workspace 406 may include navigable tabs 422 to allow navigation between the different workspace views of the client-side application 102. Navigation between views may serve as states within the definitions of the presentation elements to be displayed at the client-side application 102.

A Mashup element may be made of other Mashup elements, which may be referred to as a nested Mashup or a "contained-Mashup". The development workspace 406 provides a "contained-Mashup" widget 424. The widget 424 is shown having a widget representation 424*a* in the workspace 406 and having a data representation 424*b* in the second development workspace 412. A nested Mashup or contained-Mashup is a part of a Mashup definition.

Figure 5:
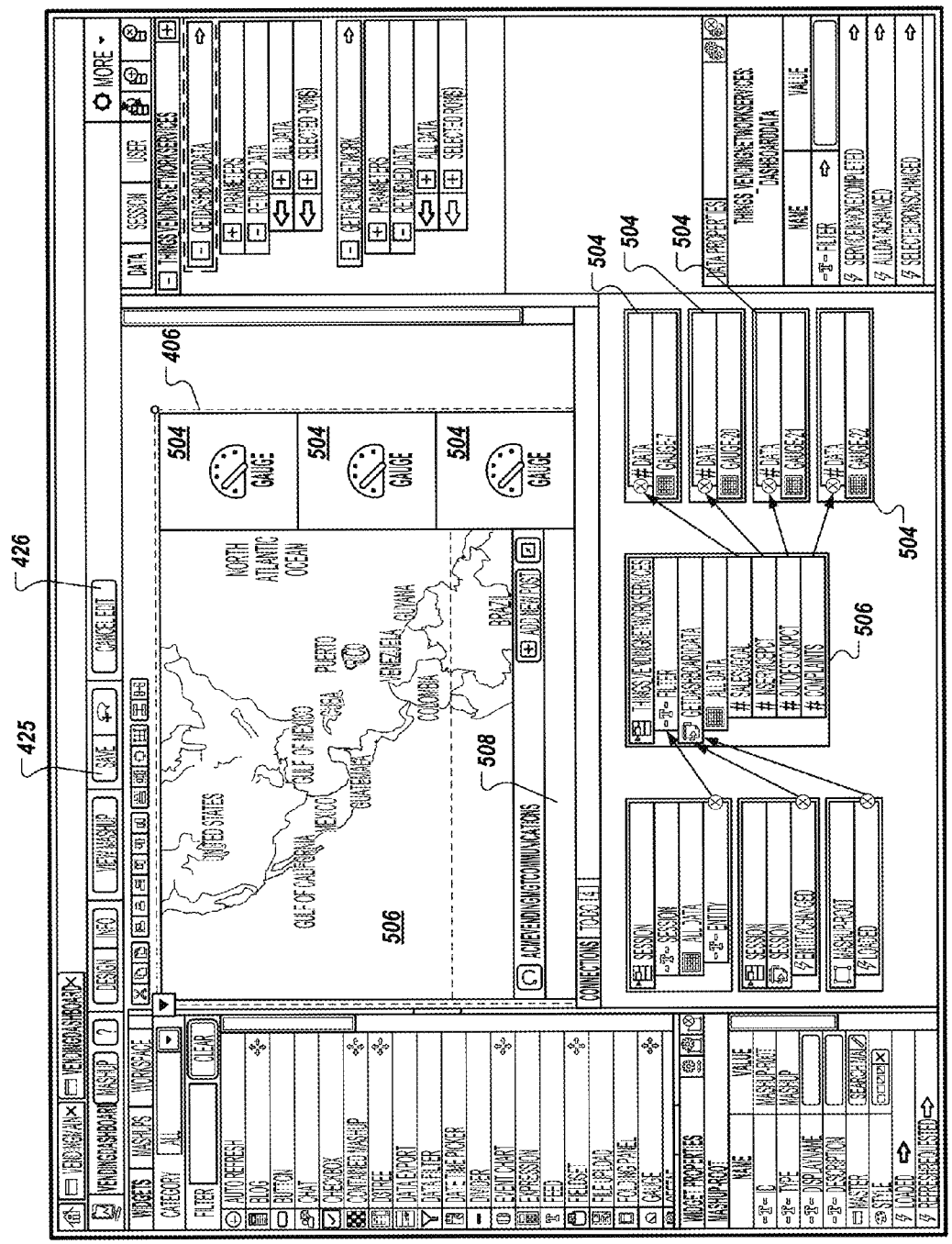
FIG. 5 illustrates an example workspace environment to build a Mashup definition in accordance with an embodiment of the invention.

FIG. 5 illustrates an example development workspace 110 to build a Mashup definition in accordance with an embodiment of the invention. The development workspace 110 also provides a navigational tab 403 to select among the various workspace definitions. As shown, the figure provides a workspace 406 for a nested Mashup 424*a*, as described and shown in relation to FIG. 4. In some implementations, a nested Mashup may be build or designed in a similar manner to building a Mashup, as described in relation to FIG. 4.

Other widgets components 402 shown in FIG. 5 include a Mashup for "communication logs" 508, a map service 506, and Mashup for gauge elements 504. The communication logs may provide a display of real-time communication between end users during runtime. The gauge elements 504 may be provide displayable view of data from a Web data or service. The map service may provide a display of real-time map data such as that provided by Google Map API.

In an aspect of an embodiment of the invention, to reduce the testing time of a prototype client-side application, the save process is used as a trigger for both development actions and test actions. The save process may be executed at the development workspace 110 and/or the server-side application.

Turning back to FIG. 3A, upon the application developer 202 saving an instance of the development workspace 110, a modified Webpage definition file 304 is created.

The save process may initiate the wrapper process to generate the modified Webpage definition files 304, as described in relation to FIG. 4.

In some implementations, the save process may be triggered by the save command 425 received at the development workspace 110. Additionally, the modified Webpage definition file may be generated when the link relationship between the data and widget component is changed. Additionally, the modified Webpage definition file may be generated when the properties of the data component or the widget component are changed within the properties windows 418 or 420. Additionally, the modified Webpage definition file may be generated when annotations are added to the workspace. Additionally, the modified Webpage definition file may be generated when navigable tabs 422 are changed. Additionally, the modified Webpage definition file may be generated when nested Mashup are created, modified, replaced, or deleted.

In some implementations, the modified Webpage definition file may also be generated based on any change to a presentation elements or a logical connection with a data element, as described in relation to FIGS. 4 and 5. For example, the modified Webpage definition file may be generated when a new widget is added, replaced, modified, or removed. Similarly, the modified Webpage definition file may be generated when a workspace is added, removed, or changed in relation to size and/or location.

In some implementations, the modified Webpage definition file 304 replaces the new or previously saved or retrieved Webpage definition file.

In some implementations, the save process causes the server-side application 200 to transfer the modified Webpage definition files 304 to the workspace environment 110. To this end, a save command causes the definitions files 304 to be tested on both the workspace environment 110 and the client-side application 102. In such implementations, the workspace environment 110 may open a test window to display a preview of the Mashup. The server-side application 200 may provide the data content 306 and/or the Web-services 308 required for the display.

Figure 6:
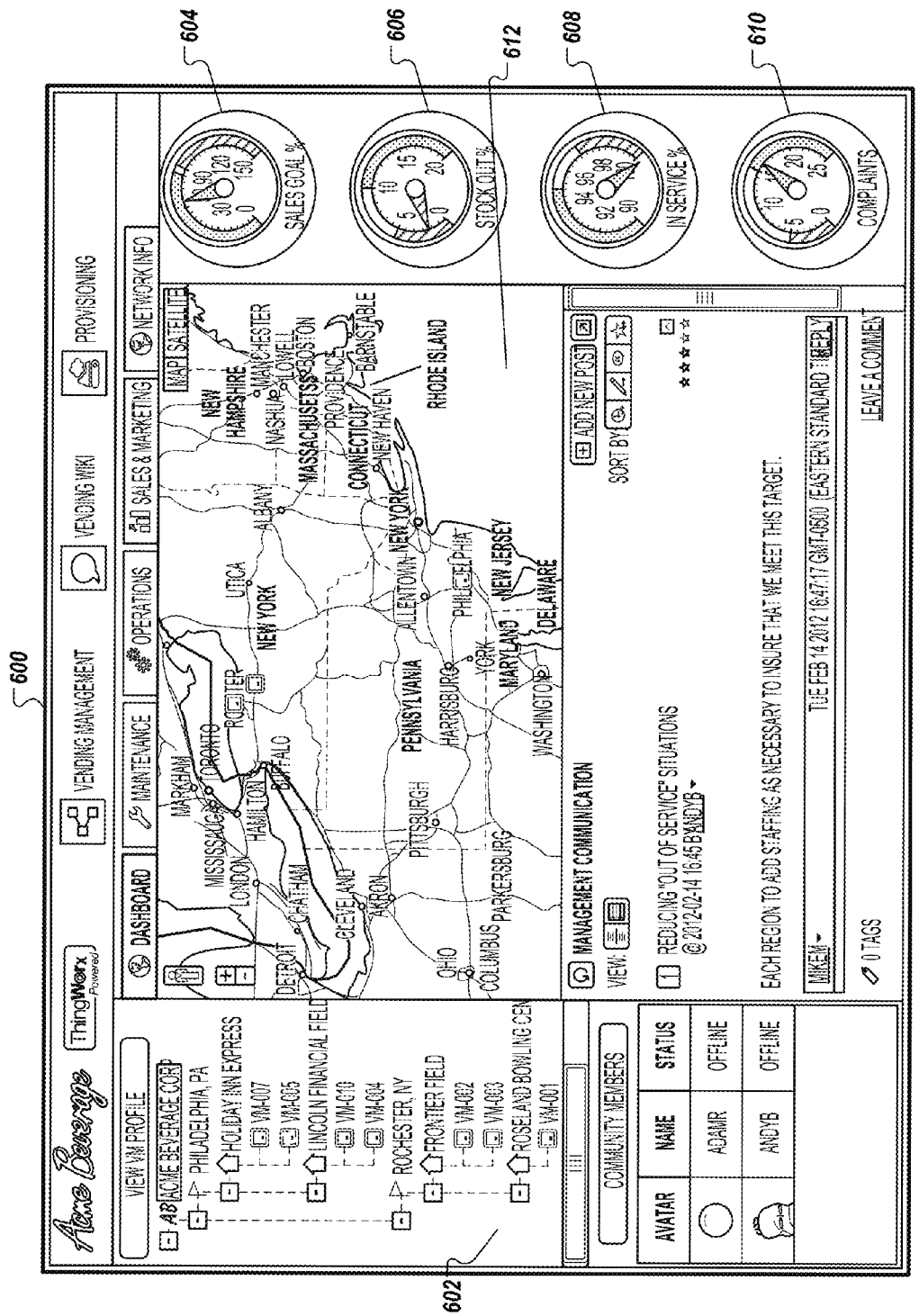
FIG. 6 illustrates an example real-time Web application generated from Webpage definition files corresponding to the Mashup definition of FIGS. 5 and 6 in accordance with an embodiment of the invention.

FIG. 6 illustrates an example real-time Web application 600 generated from the Webpage definition files corresponding to the Mashup definition of FIGS. 4 and 5 in accordance with an embodiment of the invention.

As shown, the client-side application 600 displays a Mashup Web application intended for a vending-machine operator relating to a set of deployed vending machines (shown as "VM-001", "VM-002", "VM-003", "VM-004", "VM-005" and "VM-007").

To this end, the Mashup Web application provides a dashboard for a given operator to view data associated with the vending machines. Here, the data includes "sales goal volume" information (in percentage), "frequency of stock being out" information (as a percentage of the month), "frequency the machine is in service" information, and "number of complaints received" information. The data are respectively displayed on gauges 604, 606, 608, and 610.

The Mashup Web application also displays map service information associated to a given vending machine and its respective location. As shown, the deployed vending machines are organized by sites (shown as "Holiday Inn Express", "Lincoln Financial Field", "Frontier Field", and "Roseland Bowling Center"), by regions (shown as "Philadelphia, Pa." and "Rochester, N.Y."), and by companies (shown only as "Acme Beverage Corp"). To this end, the Mashup Web application may have a number of display states, which are based on an end-user's selection of what he or she would like displayed. The locations and vending machines are organized in a tree diagram 602 having nested elements in a multi-level table.

Upon selecting a vending machine or a location in the tree diagram 602, the client-side application 600 is configured to display the appropriate data information. In some implementations, the tree diagram 602 is a Widget component, namely the "tree" table 408, as described in relation to FIG. 4. Similarly, in some implementations, gauges (604, 606, 608, and 610) correspond to the gauge elements 506, as shown in FIG. 5.

Turning back to FIG. 3A, in another aspect of the embodiment of the invention, the saving process may trigger a function that updates a given prototype client-side application without requiring the application developer to physically touch any of the test devices to initiate the update. In some implementations, upon receipt of a trigger message from the Web server platform 108, each of the test devices 104a to 104f is triggered to receive the modified Webpage definition files 304.

In some implementations, a given test devices 104a to 104f may receive the update by various conventional push, pull, and update operations. For example, in some implementations, a given test devices 104a to 104f may receive the update by the Web server platform 108 pushing the update Webpage definition files 304 to the device 104. Alternatively, in some implementations, a given test devices 104a to 104f may receive the update by the device 104 pulling the updated Webpage definition files 304 from the Web server platform 108.

In some implementations, upon the modified Webpage definition file being received, the client-side application updates the set of current Webpage definition files with the set of modified Webpage definition files without any input by the user at the client-side application. In some implementations, to update the files, the client-side application may replace the current Webpage definition files running at the client-side application 102 with the modified Webpage definition file. Alternatively, to update the files, the client-side application 102 may execute the updated Webpage definition files and then delete files current Webpage definition files. Alternatively, to update the files, the client-side application may read, write, or modify using various conventional operations.

In another aspect of the embodiment of the invention, to reduce the testing time of a client-side application having Mashup elements, the development platform provides a function to allows for a given updated client-side application to retain the last view being displayed on a given test device before the update had occurred. In some implementations, the retention may be associated to both a given navigable screen as well as various presentation states of each of the Mashup elements that may be presented in that particular screen, as described in relation to FIG. 4.

To retain the last view, in some implementations, client side application may use the data content to retain viewable state information of the Mashup. In some implementations, the data content is structured as a hierarchical data table. To this end, a presentation state may be associated to elements located within the hierarchical data table. In some implementations, this presentation state may be a path that defines relationships between node elements composing the hierarchical data table.

An example of retaining the last view being displayed prior to updating the modified Webpage definition file is now discussed. As described in FIG. 6, the client-side application includes a tree diagram 600 to display the vending machines organized by sites, by regions, and by companies. To this end, an application developer 202 or an end-user may select an individual vending machines to see specific information relating to the selected machine, or select a site to see aggregated information of the machines associated to that site, or select a region to see aggregated information of sites associated to that region, or select a company to see aggregated information of regions associated to that company. Each of the selections, in essence, presents a different state of the Mashup display for the client-side application.

Figure 7:
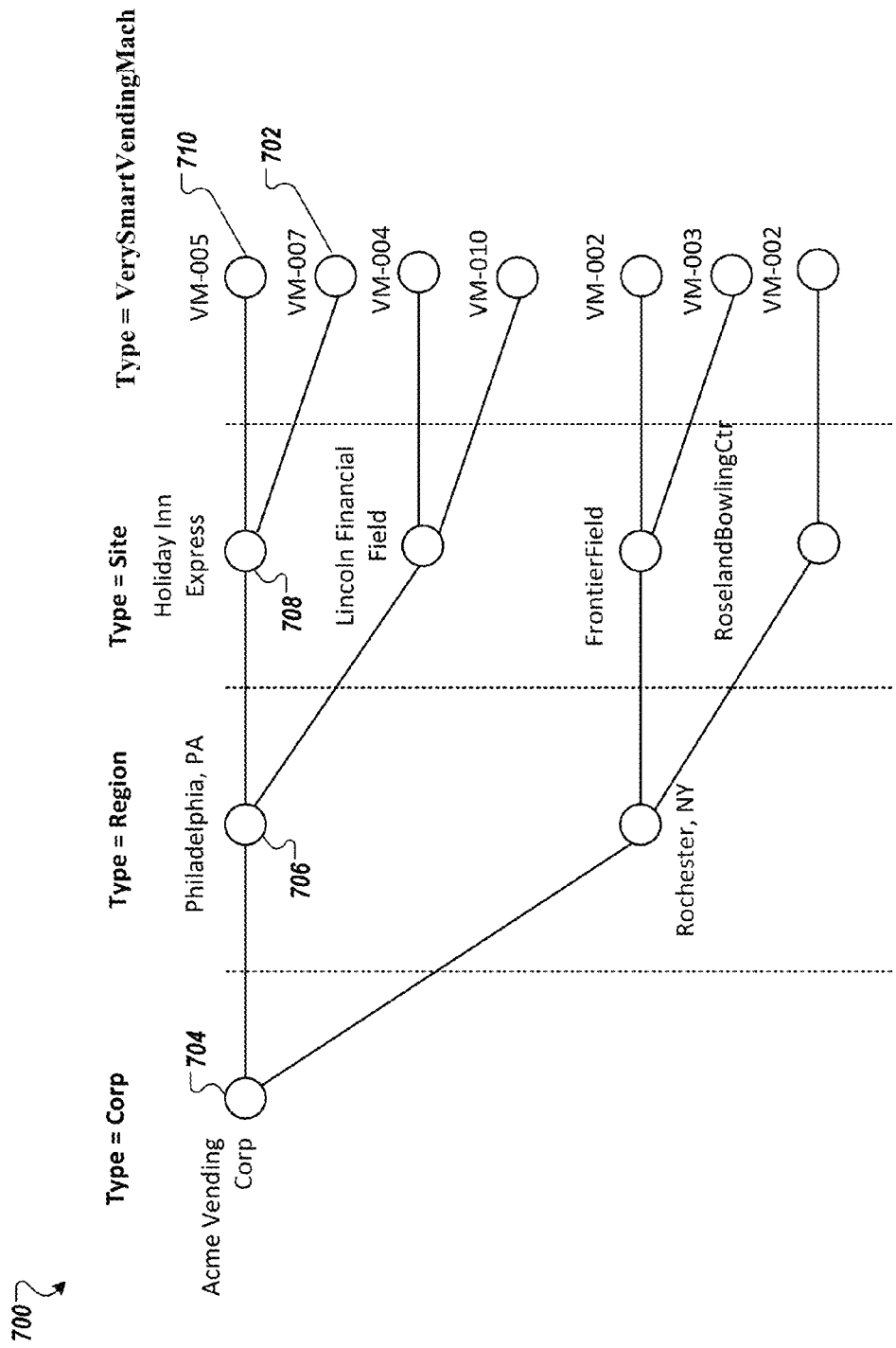
FIG. 7 illustrates an example multi-level hierarchical data to be used during runtime of a real-time Web application in accordance with an embodiment of the invention.

FIG. 7 illustrates an example method of updating the client-side application in accordance with an embodiment of the invention. Specifically, the figure illustrates an example multi-level hierarchical data table 700 corresponding to the example tree diagram 602 shown in FIG. 6. As shown, each of the nodes is organized based on node types. To this end, the client-side application maintains a cursor to a given node during run time. In some implementations, the cursor may be defined as a path within the diagram. This path may be defined by both nodes along the path and relationships between the nodes.

Take for example, the last review being shown being of a vending machine "VM-007" node 702. The cursor is, thus, located at "VM-007" node 702. "VM-007" node 702 has a path defined by a set of data nodes, including node 702, 704, 706, and 708 (i.e, VM-007" node 702," Acme Vending Corp" node 704, "Philadelphia, Pa." node 706, and "Holiday Inn Express" node 708). The path is also defined by the relationships among the nodes. In some implementations, the relationship includes the "Acme Vending Corp" node 704 being linked to the "Philadelphia, Pa." node 706, the "Philadelphia, Pa." node 706 being linked to the "Holiday Inn Express" node 708, and the "Holiday Inn Express" node 708 being linked to the "VM-007" node 702.

To this end, in some implementations, when updating the modified Webpage definition file, the client-side application 102 stores a path describing the data-node relationship that is associated a selected cursor. Subsequently, after the modified Webpage definition file has been updated, the client-side application 102 traverses the data table to the same selected cursor using the stored path. In instances in which the data structure or the presentation element is no longer present, the client-side application 102 may display a default state (such as the root of the data table) or the furthest state along the path before a break in the node occurs.

In another aspect of an embodiment of the invention, the real-time Web application is configured to receive data organized in a structure mirroring its hierarchical data table 700. As described in relation to FIGS. 6 and 7, a tree diagram, for example, may be structured as a multi-level hierarchy. To this end, each of the nodes within the tree diagram may form a nested level that collectively defines a multi-level hierarchy. In some implementations, a server providing data service to the client-side application can provide the data organized with the same node structure as this multi-level hierarchy.

In some implementations, the server may provide the data record in a self-describing message. A self-describing message refers to a message having both data and metadata that provides a description of the data. In some implementations, the metadata may be described in a structure known to both the server-side application that generates the message and the client-side application that consumes the message. In some implementations, the structure is defined as part of a Representational state transfer (REST) style data-model.

Figure 8:
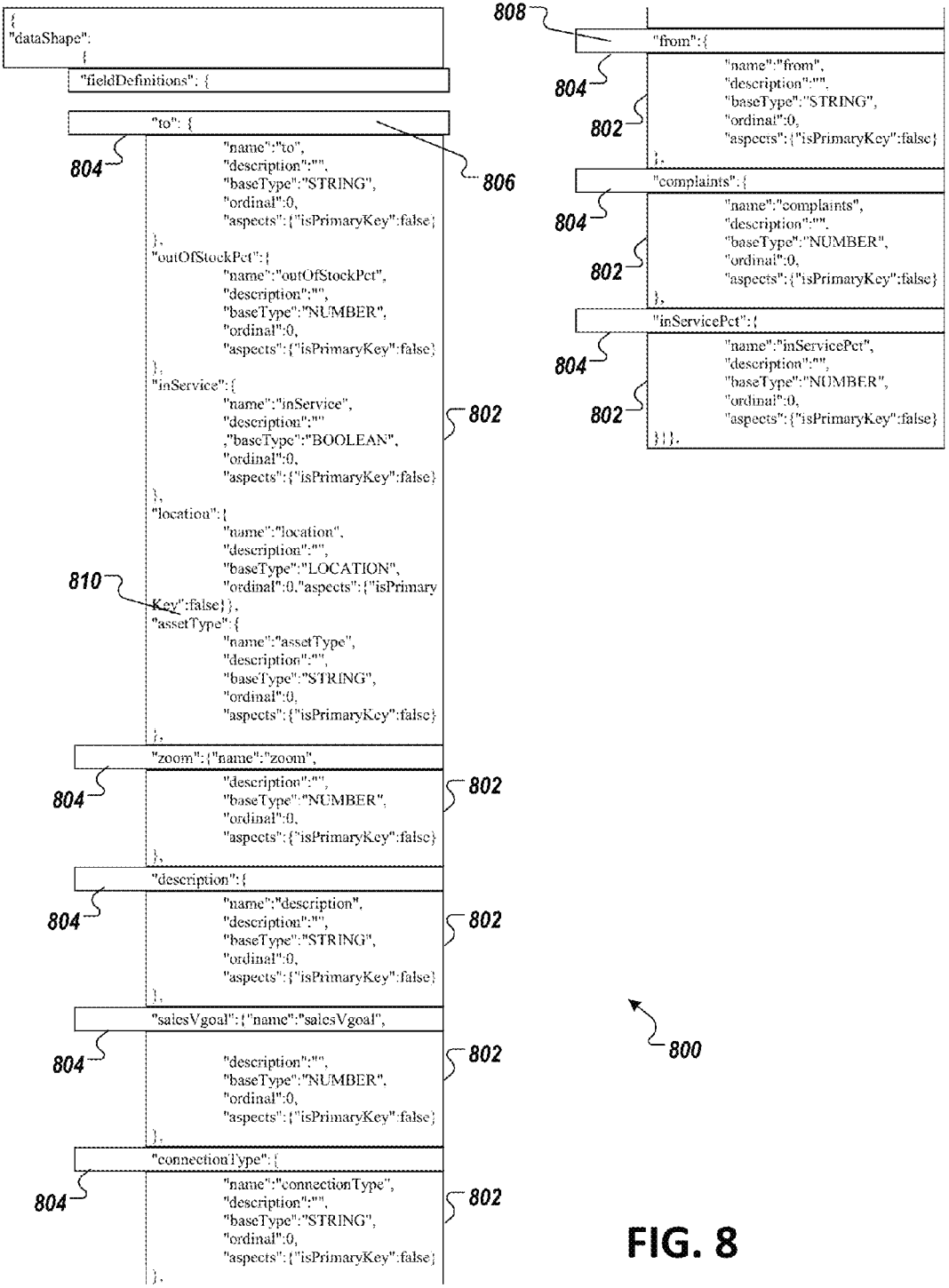
FIG. 8 illustrates an example data-model object used to generate the example multi-level hierarchical data of FIG. 7 in accordance with an embodiment of the invention.

FIG. 8 illustrates an example data table 800 used in the operation of the real-time Web application in accordance with an embodiment of the invention. Specifically, the figure illustrates an example data-model object used to generate the example multi-level hierarchical data of FIG. 7. One such data-model object is an "InfoTable." The InfoTable is generally a self-describing data table having data and metadata to describe properties of the data. For example, the metadata may include definitions 802 of various data fields 804, such as name, description, types, ordinal, and aspects.

The metadata may include definitions of objects that may be used to generate multi-level hierarchy data set. In some implementations, the metadata may include a "to" field definition 806 and a "from" field definition 808. Moreover, the metadata may include an "asset Type" field definition 810 to serve as attribute associated with a level. To this end, a data object may be structured as a linked list to form a hierarchical relationship where nodes within each level of the hierarchy shares a common "asset Type" field definition 810.

Further examples and description of InfoTable are described in co-pending and concurrently filed patent application, titled "SYSTEM AND METHOD OF ABSTRACTING COMMUNICATION PROTOCOL USING SELF-DESCRIBING MESSAGES," filed Mar. 21, 2014, naming inventors Rick Bullotta, John Canosa, Bob DeRemer, and Mike Mahoney, and having Ser. No. 14/222,067. The application is incorporated herein by reference in its entirety.

Figure 9:
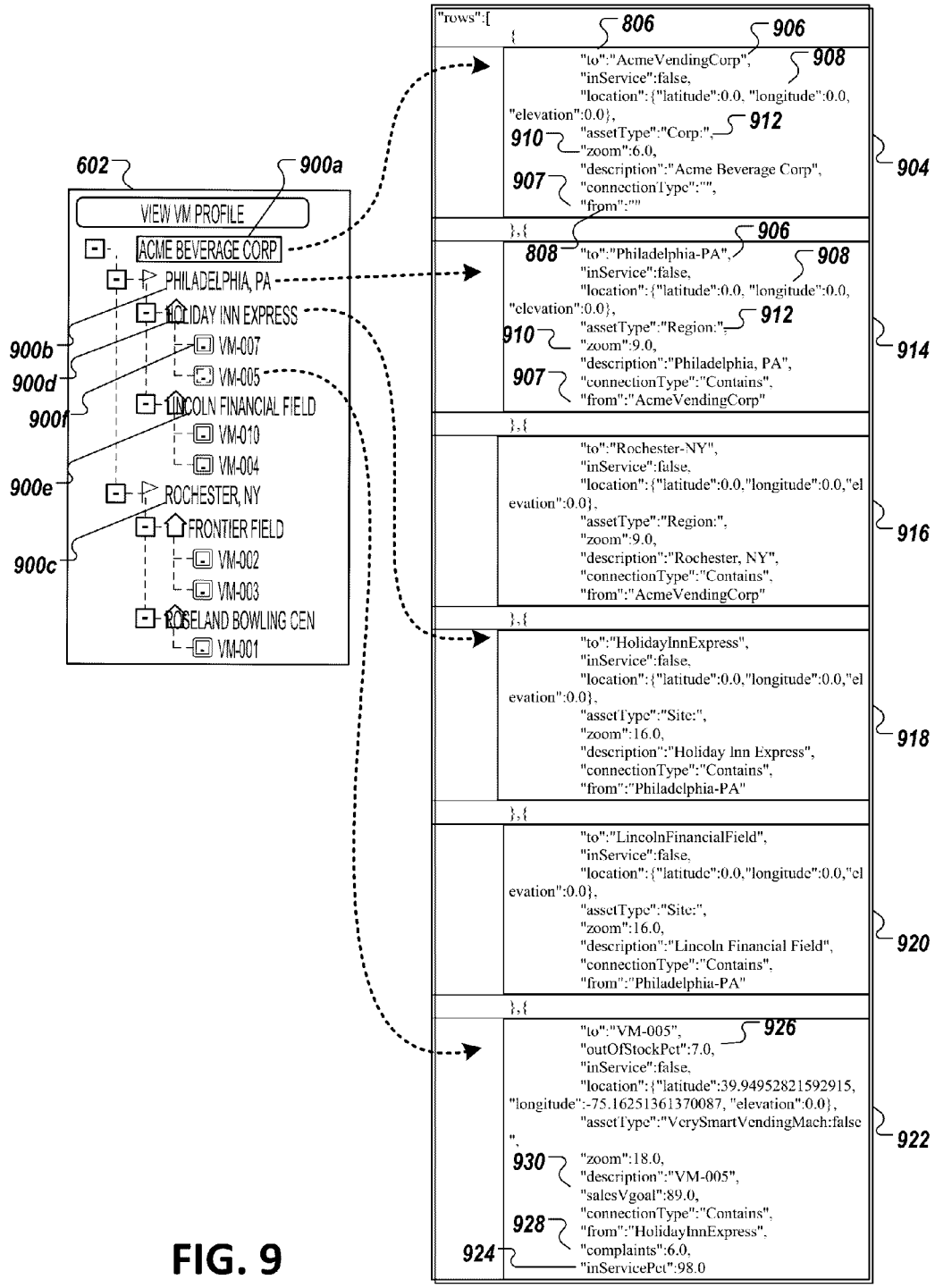
FIG. 9 illustrates an example method of using multi-level hierarchical data with a Mashup widget in accordance with an embodiment of the invention.

FIG. 9 illustrates an example method of using multi-level hierarchical data with a Mashup widget in accordance with an embodiment of the invention.

The tree diagram 602 of FIG. 6 is shown mapped to data records organized in a multi-level hierarchy. The data records includes data objects (904, 914, 916, 918, 920, and 922) that organizes to the same hierarchical structure 700 as the tree diagram 602.

Specifically, the data records include several field values (906, 908, 910, 912), which are related to the structural information associated to the various nodes, as well as the attribute and the specific record of the data. As shown, the structural information of each of the field values may be used to organize the elements as a linked list. These structural information include a "to" field 906, a "from" field 907, and an "assetType" field 912.

As shown, the data object 904 ("Acme Vending Corp") is a "Corp" asset-type 912 connected to "Acme Vending Corp". To this end, the data object 904 serves as the first node in the list. The data object 914 ("Philadelphia-PA") is a "Region" asset type 912 connected from "Acme Vending Corp" to "Philadelphia-PA". Data object 918 ("Holiday Inn Express") is a "Site" asset-type 912 connected from "Philadelphia-PA" to "Holiday Inn Express". Subsequently, the data object 922 ("VM-005") is a "VerySmartVendingMach" asset-type 912 connected from "Holiday Inn Express" to "VM-005". Looking at FIG. 7, this relationship mirrors the shown path in which the node 704 connects to the node 706, the node 706 connects to the node 708, and the node 708 connects to the node 710.

As shown, the data records is represented in JavaScript Object Notation (JSON) format. It should be appreciated that the example is merely for exemplary purposes and that other types representation of the data may be employed.

As shown, the data records include data associated to each of the vending machines. This data may include values relating to "sales volume goal" 920, "number of complaints" 922, "in-server percentage" 924, and "out-of-stock percent" 926. The data may be used by the gauge widgets (604, 606, 608, and 610) to be displayed, as described in relation to FIG. 6. To this end, a new cursor selection to another vending machine in the tree diagram 602 does not necessitate the client-side application to retrieve additional data from a server.

To this end, a single record set of the content data allows for the client-side application to change its state to any of the Mashup views during runtime.

In some implementations, the record set may be cached, as described in relation to FIG. 3C, to allow the operations of the client-side application, including the Mashup element, even when the communication to the server-side application is not present.

Figure 10:
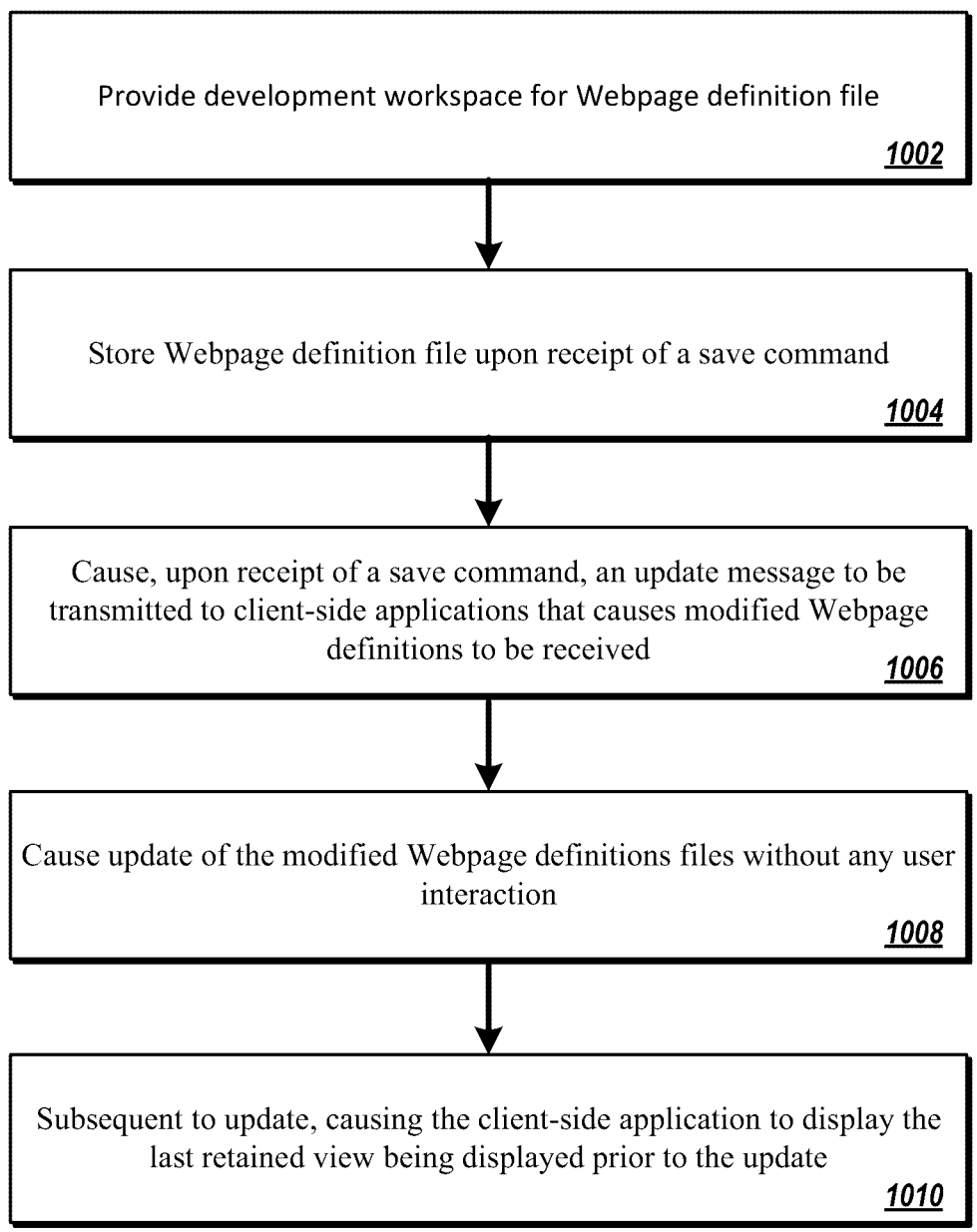
FIG. 10 is a flow chart of an example method of developing a real-time Web application for multiple platforms in a heterogeneous environment in accordance with an embodiment of the invention.

FIG. 10 is a flow chart of an example method 1000 of developing a computing application for multiple platforms in a heterogeneous environment in accordance with an embodiment of the invention. The method begins by having provided, by a first computer, a development workspace (step 1002), as shown and described in relation to FIGS. 4 and 5, to build a set of Webpage definition files for running on one or more client-side applications. The development workspace combines a number of composite Web-service objects for the set of Webpage definition files. Composite Web-service objects may include Widgets elements and Mashup elements. The composite Web-service object may include a content-source service selected from a group consisting of a map service, a calendar service, a data stream service, a wiki page service, and a portal service. A content source of the content sources may be selected from a group consisting of public Web-service API, a third-party Web-service API, a Web-widget library, a Web-toolkit library, a screen scraping of a Web-site, a local database, and a Wiki page. The client-side application is figured to run on a set of connected platforms composing a heterogeneous environment, for example, as shown and described in relation to FIG. 2.

The method 1000 includes storing a set of modified Webpage definition files responsive to a save command being received by an input at the development workspace (step 1004), for example, shown and described in relation to FIGS. 3A and 3B. The set of modified Webpage definition files includes at least one modification of at least one of the composite Web-service objects from a set of current Webpage definition files associated with a previous save command.

The method 1000 then may include causing, by a processor responding to the save command, a message to be transmitted to each of the client-side applications on the connected platforms (step 1006), for example, as described in FIG. 3A. The message may cause each of the client-side applications to receive the set of modified Webpage definition files to which receiving occurs without any input by a user at the client-side application.

The method 1000 then may include causing the client-side application to update the set of current Webpage definition files with the set of modified Webpage definition files upon receipt of the set of modified Webpage definition files (step 1008), for example, as shown as described in relation to FIGS. 3A and 3B. The updating occurs without any input by the user at the client-side application.

The method then includes causing the client-side application to display the last retained view being display prior to the update (step 1010), for example, as shown and described in relation to FIGS. 3A and 7.

Figure 11:
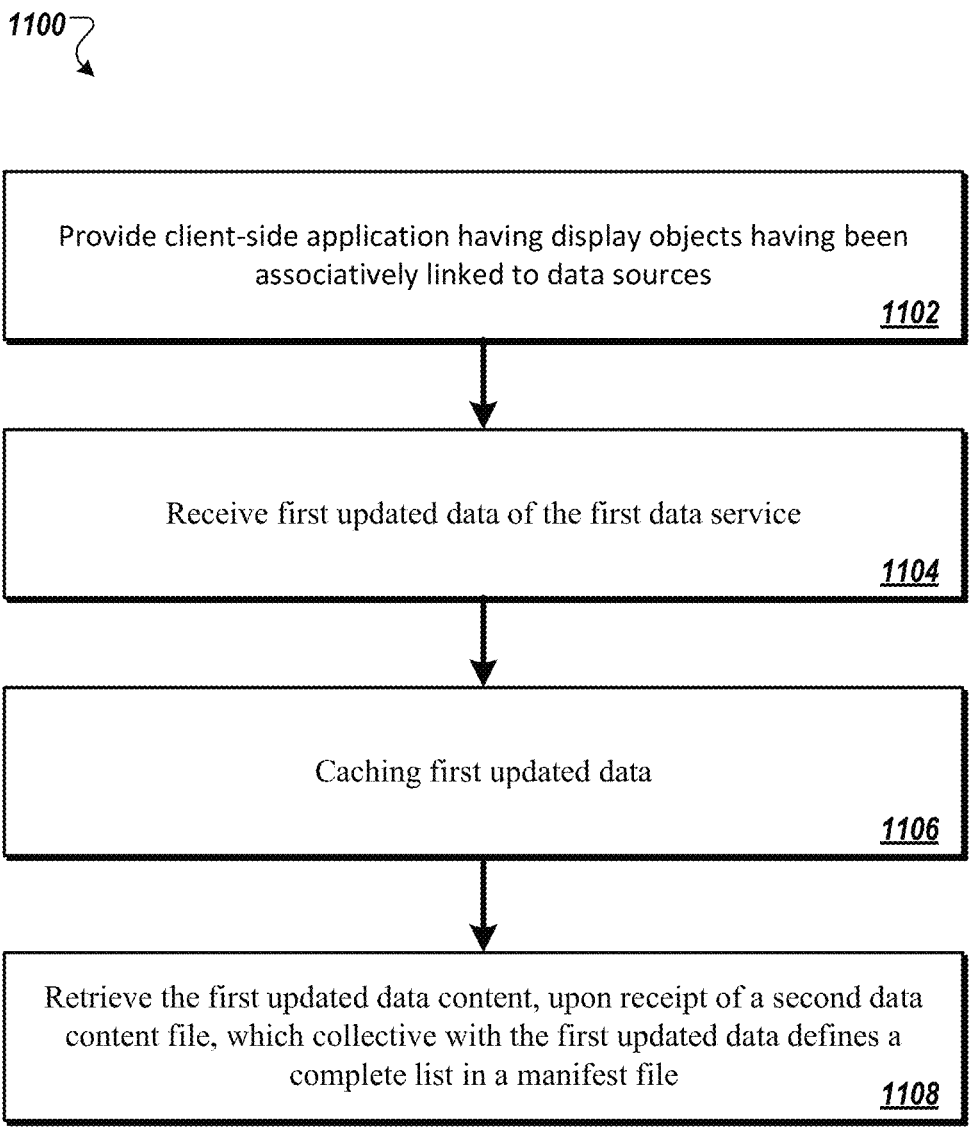
FIG. 11 is a flow chart of an example method of caching Mashup objects during runtime in accordance with an embodiment of the invention.

FIG. 11 is a flow chart of an example method 1100 of building associative links between Mashup objects in a development workspace, the associative links being used to cache the Mashup objects during runtime in accordance with an embodiment of the invention.

The method 1100 includes providing a client-side application running on a connected device (step 1102), for example, as described in relation to FIGS. 4 and 5. The client-side application has a number of Webpage definition files having one or more composite Web-service objects, including a first composite Web-service object and a second composite Web-service object. The first composite Web-service object is associatively linked to a first data service from a first data source and the second composite Web-service object is associative linked to a second data service from a second data source.

The method 1100 includes receiving, during runtime of the client-side application, a first updated data content of the first data service from the first data source (step 1104), for example, as shown and described in relation to FIG. 3C. The first updated data content may be listed in a manifest file. Examples of the first updated data content includes, for example, but not limited to, Javascript object, an HTML object, an image, a Web-Mashup definition, and a Web-Mashup artifact.

The method 1100 includes caching the first updated data content in memory (step 1106) if other files in the manifest file are not present, as shown and described in relation to FIG. 3C.

The method 1100 includes, upon receiving a second updated data content of the second data service from the second data source, retrieving the first updated data content from memory and updating the composite Web-service objects of the Webpage definition files with the first and second update data contents (step 1108). Updates of the composite Web-service objects may be performed in a transactional manner.

Figure 12:
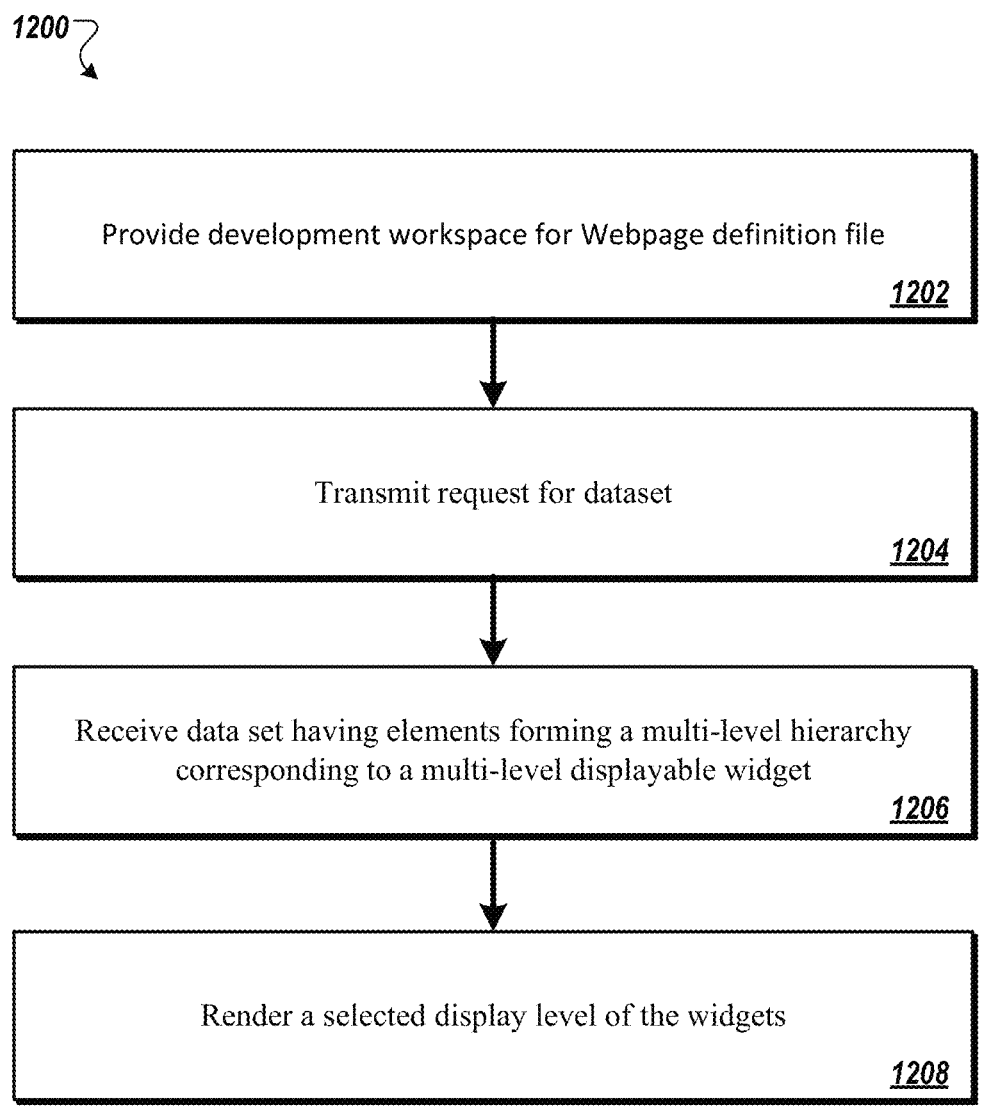
FIG. 12 is a flow chart of an example method of rendering Mashup elements using multi-level hierarchical data in accordance with an embodiment of the invention.

FIG. 12 is a flow chart of an example method 1200 of using multi-level hierarchical data during runtime in accordance with an embodiment of the invention.

The method 1200 includes providing, at a client-side application at a computing device, a graphical user interface having one or more rendering widgets and an input widget having one or more levels (step 1202) where each of the one or more rendering widgets had been associated to one or more data content source. The rendering widgets may have been associatively linked to one or more data content source at a development workspace used to define the rendering widget, for example, as shown and described in relation to FIGS. 4 and 5.

In some implementations, the graphical user interface may include a map widget where the received data set include data for each of the levels of the input widget for the map widget.

The method 1200 includes transmitting, at the client-side application, a request for a dataset corresponding to the data content source (step 1204). The transmission may be in response to a alert received at the client-side application.

The method 1200 includes receiving, at the client-side application, the data set where the data set forms a multi-level hierarchy corresponding one or more levels of the input widget (step 1206), for example, as shown and described in relation to FIGS. 7-9. The data set may include one or more data content source associated with the rendering widgets. The input widget may be presented as a tree diagram.

In some implementations, the received data set is organized as an InfoTable.

The method 1200 includes displaying a selected rendering widgets with a data content source (step 1208) where the selected rendering widgets corresponds to a selected level of the input widget, for example, as shown and described in FIG. 6.

Figure 13:
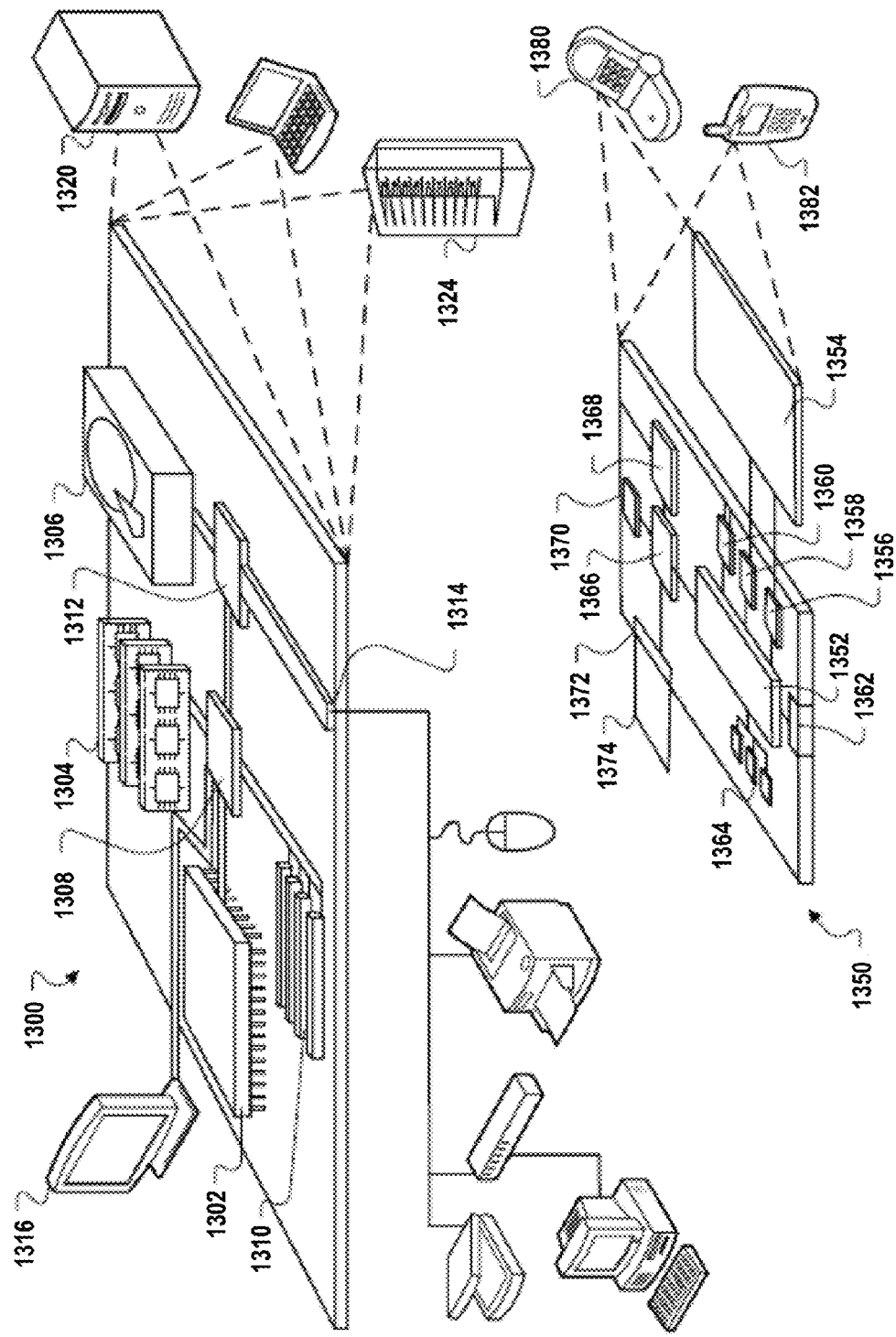
FIG. 13 is a block diagram of a computing device and a mobile computing device.

FIG. 13 shows an example of a computing device 1300 and a mobile computing device 1350 that can be used to implement the techniques described in this disclosure. The computing device 1300 is intended to represent various forms of digital computers, such as laptops, desktops, workstations, personal digital assistants, servers, blade servers, mainframes, and other appropriate computers. The mobile computing device 1350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1304 stores information within the computing device 1300. In some implementations, the memory 1304 is a volatile memory unit or units. In some implementations, the memory 1304 is a non-volatile memory unit or units. The memory 1304 may also be another form of computer-readable medium, such as a magnetic or optical disk.

The storage device 1306 is capable of providing mass storage for the computing device 1300. In some implementations, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1302), perform one or more methods, such as those described above. The instructions can also be stored by one or more storage devices such as computer- or machine-readable mediums (for example, the memory 1304, the storage device 1306, or memory on the processor 1302).

The high-speed interface 1308 manages bandwidth-intensive operations for the computing device 1300, while the low-speed interface 1312 manages lower bandwidth-intensive operations. Such allocation of functions is an example only. In some implementations, the high-speed interface 1308 is coupled to the memory 1304, the display 1316 (e.g., through a graphics processor or accelerator), and to the high-speed expansion ports 1310, which may accept various expansion cards (not shown). In the implementations, the low-speed interface 1312 is coupled to the storage device 1306 and the low-speed expansion port 1314. The low-speed expansion port 1314, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. In addition, it may be implemented in a personal computer such as a laptop computer 1322. It may also be implemented as part of a rack server system 1324. Alternatively, components from the computing device 1300 may be combined with other components in a mobile device (not shown), such as a mobile computing device 1350. Each of such devices may contain one or more of the computing device 1300 and the mobile computing device 1350, and an entire system may be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 may also be provided with a storage device, such as a micro-drive or other device, to provide additional storage. Each of the processor 1352, the memory 1364, the display 1354, the communication interface 1366, and the transceiver 1368, are interconnected using various buses, and several of the components may be mounted on a common motherboard or in other manners as appropriate.

The processor 1352 can execute instructions within the mobile computing device 1350, including instructions stored in the memory 1364. The processor 1352 may be implemented as a chipset of chips that include separate and multiple analog and digital processors. The processor 1352 may provide, for example, for coordination of the other components of the mobile computing device 1350, such as control of user interfaces, applications run by the mobile computing device 1350, and wireless communication by the mobile computing device 1350.

The processor 1352 may communicate with a user through a control interface 1358 and a display interface 1356 coupled to the display 1354. The display 1354 may be, for example, a TFT (Thin-Film-Transistor Liquid Crystal Display) display or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may provide communication with the processor 1352, so as to enable near area communication of the mobile computing device 1350 with other devices. The external interface 1362 may provide, for example, for wired communication in some implementations, or for wireless communication in other implementations, and multiple interfaces may also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 may also be provided and connected to the mobile computing device 1350 through an expansion interface 1372, which may include, for example, a SIMM (Single In Line Memory Module) card interface. The expansion memory 1374 may provide extra storage space for the mobile computing device 1350, or may also store applications or other information for the mobile computing device 1350. Specifically, the expansion memory 1374 may include instructions to carry out or supplement the processes described above, and may include secure information also. Thus, for example, the expansion memory 1374 may be provide as a security module for the mobile computing device 1350, and may be programmed with instructions that permit secure use of the mobile computing device 1350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 1352), perform one or more methods, such as those described above. The instructions can also be stored by one or more storage devices, such as one or more computer- or machine-readable mediums (for example, the memory 1364, the expansion memory 1374, or memory on the processor 1352). In some implementations, the instructions can be received in a propagated signal, for example, over the transceiver 1368 or the external interface 1362.

The mobile computing device 1350 may communicate wirelessly through the communication interface 1366, which may include digital signal processing circuitry where necessary. The communication interface 1366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1368 using a radio-frequency. In addition, short-range communication may occur, such as using a Bluetooth®, Wi-Fi™, or other such transceiver (not shown). In addition, a GPS (Global Positioning System) receiver module 1370 may provide additional navigation- and location-related wireless data to the mobile computing device 1350, which may be used as appropriate by applications running on the mobile computing device 1350.

The mobile computing device 1350 may also communicate audibly using an audio codec 1360, which may receive spoken information from a user and convert it to usable digital information. The audio codec 1360 may likewise generate audible sound for a user, such as through a speaker, e.g., in a handset of the mobile computing device 1350. Such sound may include sound from voice telephone calls, may include recorded sound (e.g., voice messages, music files, etc.) and may also include sound generated by applications operating on the mobile computing device 1350.

The mobile computing device 1350 may be implemented in a number of different forms, as shown in the figure. For example, it may be implemented as a cellular telephone 1380. It may also be implemented as part of a smart-phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementations of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method of developing real-time Web applications for multiple platforms in a heterogeneous environment are provided. Having described certain implementations of methods and apparatus of developing real-time Web applications, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A computer-implemented method for updating Web-service objects, comprising:
   storing, in a memory of a client-computing device, a client-side application,
      the client-side application comprising a plurality of Webpage definition files, each of the plurality of Webpage definition files defining and being associatively linked with a plurality of composite Web-service objects,
      the plurality of composite Web-service objects comprising at least a first composite Web-service object and a last composite Web-service object,
      the first composite Web-service object being associatively linked with a first data service from a first data source, and the last composite Web-service object being associatively linked with a last data service from a last data source, and
      the client-side application being associated with a manifest file comprising a list of contents associated with the client-side application, the list of contents identifying the plurality of composite Web-service objects;
   executing, by a processor of the client-computing device, the client-side application;
   receiving, during runtime of the client-side application, from the first data source over a network, a first updated data content of the first data service;
   caching, during runtime of the client-side application, the first updated data content in the memory;
   receiving, during runtime of the client-side application, from the last data source over the network, a last updated data content of the last data service;
   determining, by the processor, that updated data content for all of the contents identified in the list of contents, including the first composite Web-service object and the last composite Web-service object, have been received; and
   in response to the determining that the updated data content for all of the contents identified in the list of contents have been received, updating the plurality of composite Web-service objects of the client-side application, wherein the updating the plurality of composite Web-service objects comprises updating the first composite Web-service object using the cached first updated data content and updating the last composite Web-service object using the received last updated data content.

2. The computer-implemented method of claim 1, wherein the updating the plurality of composite Web-service objects with at least the first and last updated data contents is performed in a transactional manner.

3. The computer-implemented method of claim 1, wherein each of the first updated data content and the last updated data content comprises an object selected from a group consisting of a Javascript object, an HTML object, an image, a Web-Mashup definition, and a Web-Mashup artifact.

4. The computer-implemented method of claim 1,
wherein the first composite Web-service object is associatively linked with the first data service by a development workspace used to define the first composite Web-service object, and
wherein the last composite Web-service object is associatively linked with the last data service by the same development workspace.

5. The computer-implemented method of claim 4, wherein the development workspace employs a graphical user interface, the graphical user interface having an input represented as a wire diagram to link a first graphical widget representing the first composite Web-service object to a second graphical widget representing an application program interface (API) associated with a first data source corresponding to the first data service.

6. The computer-implemented method of claim 1,
wherein the first data service is associated with a first data source and the last data service is associated with a last data source,
wherein at least one of the plurality of composite Web-service objects provides a plurality of presentation states, including a first state and a second state,
the first state being associatively linked to a second data service from a second data source, the second state being associatively linked to a third data service from a third data source, and
wherein the updating of the plurality of composite Web-service objects of the plurality of Webpage definition files occurs in response to the determining that the updated data content for all of the contents identified in the list of contents have been received.

7. The computer-implemented method of claim 1, wherein each of the first updated data content and the last updated data content is structured as an InfoTable.

8. The method of claim 1,
wherein the memory of the client-computing device comprises a cache associated with the client-side application, and
wherein the caching of the first updated data content comprises caching the first updated data content in the cache associated with the client-computing device.

9. The method of claim 8, further comprising:
caching, during runtime of the client-side application, the last data content in the cache associated with the client-side application,
wherein the updating the plurality of composite Web-service objects of the client-side application is performed in response to the determining that the updated data content for all of the contents defined in the list of contents have been cached.

10. A non-transitory computer readable medium having instructions stored thereon, wherein the instructions, when executed by a processor, cause the processor to:
store, in a memory, a client-side application,
the client-side application comprising a plurality of Webpage definition files, each of the plurality of Webpage definition files defining and being associatively linked with a plurality of composite Web-service objects,
the plurality of composite Web-service objects comprising at least a first composite Web-service object and a last composite Web-service object,
the first composite Web-service object being associatively linked with a first data service from a first data source, and the last composite Web-service object being associatively linked with a last data service from a last data source, and
the client-side application being associated with a manifest file comprising a list of contents associated with the client-side application, the list of contents identifying the plurality of composite Web-service objects;
executing, by the processor, the client-side application;
receive, during runtime of the client-side application, from the first data source over a network, a first updated data content of the first data service;
cache, during runtime of the client-side application, the first updated data content in the memory;
receive, during runtime of the client-side application, from the last data source over the network, a last updated data content of the last data service;
determine, by the processor, that updated data content for all of the contents identified in the list of contents, including the first composite Web-service object and the last composite Web-service object, have been received; and
in response to the determining that the updated data content for all of the contents identified in the list of contents have been received, update the plurality of composite Web-service objects of the client-side application
wherein the update of the plurality of composite Web-service objects comprises updating the first composite Web-service object using the cached first updated data content and updating the last composite Web-service object using the received last updated data content.

11. The computer readable medium of claim 10, wherein the update of the plurality of composite Web-service objects with at least the first and last updated data contents is performed in a transactional manner.

12. The computer readable medium of claim 10, wherein each of the first updated data content and the last updated data content comprises an object selected from a group consisting of a Javascript object, an HTML object, an image, a Web-Mashup definition, and a Web-Mashup artifact.

13. The computer readable medium of claim 10,
wherein the first composite Web-service object is associatively linked with the first data service by a development workspace used to define the first composite Web-service object, and
wherein the last composite Web-service object is associatively linked with the second data service by the same development workspace.

14. The computer readable medium of claim 13, wherein the development workspace employs a graphical user interface, the graphical user interface having an input represented as a wire diagram to link a first graphical widget representing the first composite Web-service object to a second graphical widget representing an application program interface (API) associated with a first data source corresponding to the first data service.

15. The computer readable medium of claim 10,
wherein the first data service is associated with a first data source and the last data service is associated with a last data source,
wherein at least one of the plurality of composite Web-service objects provides a plurality of presentation states, including a first state and a second state,
the first state being associatively linked to a second data service from a second data source, the second state being associatively linked to a third data service from a third data source, and
wherein the updating of the plurality of composite Web-service objects of the plurality of Webpage definition files occurs in response to the determining that the updated data content for all of the contents identified in the list of contents have been received.

16. The computer readable medium of claim 10, wherein each of the first updated data content and the last updated data content is structured as an InfoTable.

17. A system comprising:
a processor; and
a memory being communicatively couple to the processor, the memory storing instructions that, when executed by the processor, cause the processor to:
store, in the memory, a client-side application,
the client-side application comprising a plurality of Webpage definition files, each of the plurality of Webpage definition files defining and being associatively linked with a plurality of composite Web-service objects,
the plurality of composite Web-service objects comprising at least a first composite Web-service object and a last composite Web-service object,
the first composite Web-service object being associatively linked with a first data service from a first data source, and the last composite Web-service object being associatively linked with a last data service from a last data source, and
the client-side application being associated with a manifest file comprising a list of contents associated with the client-side application, the list of contents identifying the plurality of composite Web-service objects;
executing the client-side application;
receive, during runtime of the client-side application, from the first data source over a network, a first updated data content of the first data service;
cache, during runtime of the client-side application, the first updated data content in the memory;
receive, during runtime of the client-side application, from the last data source over the network, a last updated data content of the last data service;
determine that updated data content for all of the contents identified in the list of contents, including the first composite Web-service object and the last composite Web-service object, have been received; and
in response to the determining that the updated data content for all of the contents identified in the list of contents have been received, update the plurality of composite Web-service objects of the client-side application
wherein the updating the plurality of composite Web-service objects comprises updating the first composite Web-service object using the cached first updated data content and updating the last composite Web-service object using the received last updated data content.

18. The system of claim 17, wherein the update of the plurality of composite Web-service objects with at least the first and last updated data contents is performed in a transactional manner.

19. The system of claim 17, wherein each of the first updated data content and the last updated data content comprises an object selected from a group consisting of a Javascript object, an HTML object, an image, a Web-Mashup definition, and a Web-Mashup artifact.

20. The system of claim 17,
wherein the first composite Web-service object is associatively linked with the first data service by a development workspace used to define the first composite Web-service object, and
wherein the last composite Web-service object is associatively linked with the last data service by the same development workspace.

21. The system of claim 20, wherein the development workspace employs a graphical user interface, the graphical user interface having an input represented as a wire diagram to link a first graphical widget representing the first composite Web-service object to a second graphical widget representing an application program interface (API) associated with a first data source corresponding to the first data service.

22. The system of claim 17,
wherein the first data service is associated with a first data source and the last data service is associated with a last data source,
wherein at least one of the plurality of composite Web-service objects provides a plurality of presentation states, including a first state and a second state,
the first state being associatively linked to a second data service from a second data source, the second state being associatively linked to a third data service from a third data source, and
wherein the updating of the plurality of composite Web-service objects of the plurality of Webpage definition files occurs in response to the determining that the updated data content for all of the contents identified in the list of contents have been received.

* * * * *